United States Patent [19]
Iwatani

[11] Patent Number: 6,023,780
[45] Date of Patent: Feb. 8, 2000

[54] DISC ARRAY APPARATUS CHECKING AND RESTRUCTURING DATA READ FROM ATTACHED DISC DRIVES

[75] Inventor: Sawao Iwatani, Kawasaki, Japan

[73] Assignee: Fujitsu Limited, Kawasaki, Japan

[21] Appl. No.: 08/851,704

[22] Filed: May 6, 1997

[30] Foreign Application Priority Data

May 13, 1996 [JP] Japan .................................. 8-117414

[51] Int. Cl.⁷ .............................. G06F 11/10; G06F 11/16
[52] U.S. Cl. ............................. 714/770; 714/6; 714/805; 714/820
[58] Field of Search ................... 371/40.15; 395/182.04; 714/770, 766, 6, 820, 805

[56] References Cited

U.S. PATENT DOCUMENTS

| | | | |
|---|---|---|---|
| 5,195,100 | 3/1993 | Katz et al. ................................. | 371/66 |
| 5,283,791 | 2/1994 | Halford .................................... | 371/40.4 |
| 5,345,565 | 9/1994 | Jibbe et al. ............................... | 395/325 |
| 5,491,816 | 2/1996 | Matoba et al. ........................... | 395/181 |
| 5,513,192 | 4/1996 | Janku et al. ............................. | 371/50.1 |
| 5,526,507 | 6/1996 | Hill ......................................... | 395/441 |
| 5,812,748 | 9/1998 | Ohran et al. ........................... | 395/182.2 |

OTHER PUBLICATIONS

08/530724 Sep. 15, 1995 Tatsuo Matoba et al. Fujitsu Limited.
08/697251 Aug. 21, 1996 Keiichi Yorimitsu, Fujitsu Limited.
08/7399965 Oct. 30, 1996 Kazuhisa Seki et al. Fujitsu Limited.
Yuji Ogawa et al., "F6401A Magnetic Disk Array Unit", Fujitsu Science Technology Journal, 31, 1, pp. 18–28 (Jun. 1995).
The RAIDBook, A Source Book for RAID Technology, Edition 1–1, The RAID Advisory Board, Nov. 18, 1993.
Hitoshi Matsushima, et al., "F1710A File Control Unit and F6493 Array Disk Subsystem", Fujitsu Science Technology Journal, 31, 1, pp. 29–35 (Jun. 1995).

*Primary Examiner*—Stephen M. Baker
*Attorney, Agent, or Firm*—Staas & Halsey, LLP

[57] ABSTRACT

The present invention relates to a disc array apparatus assuring that even if contradiction is detected in matching of parity data during a read parity check, correct host data is Restructured and can always be transferred to the host. The disc array apparatus of the present invention is particularly applicable to disc drives in the RAID configuration. For example, in a disc array apparatus of the present invention implementing RAID level 3, the disc array apparatus adds CRC data to data transferred from a host computer, divides the data, generates parity from the divided data, and stores the data and the parity data into the disc drives. During a read operation, the disc array apparatus of the present invention executes a read parity check. If contradiction is detected between the parity data stored in the disc drives and the parity data generated during the read parity check, the disc array controller sequentially assumes, one disc drive at a time, that one of the disc drives is storing erroneous data, restructures the host data from the divided data and parity data of the disc drives other than the disc drive storing erroneous data for each assumption, and executes a CRC check on the restructured host data for each assumption. Restructured host data is determined to be correct host data when the CRC check detects no error. The principle of the present invention is also implemented in other RAID levels, and using data such as time or counter value, to determine and restructure erroneous data.

20 Claims, 17 Drawing Sheets

DISC ARRAY APPARATUS CHECKING AND RESTRUCTURING DATA READ FROM ATTACHED DISC DRIVES

CROSS-REFERENCE TO RELATED APPLICATIONS

This application is based on, and claims priority to, Japanese Patent application 8-117414, filed May 13, 1996 in Japan, and which is incorporated herein by reference.

BACKGROUND OF THE INVENTION

A. Field of the Invention

The present invention relates to a disc array apparatus providing a plurality of disc drives, and to a disc array controller controlling data read/write operations by operating the plurality of disc drives in parallel.

B. Description of the Related Art

The related art will be explained with reference to the accompanying drawings.

1. Explanation of disc array apparatuses

FIG. 1 is an explanatory diagram of a disc array apparatus 7 of the related art. The disc array apparatus 7 is typically coupled to a host computer 1, as shown in FIG. 1. The disc array apparatus 7 is an external memory device or auxiliary memory device which has realized high speed data read/write operations by parallel operation of a plurality of magnetic disc drives (e.g hard disc drives) comprised therein and also has improved reliability through introduction of a redundant structure. Throughout the following explanation, the magnetic disc drive (or hard disc drive) is referred only to as a disc drive.

The structure of the disc array apparatus 7 of the related art is shown in FIG. 1. The disc array apparatus 7 is structured by a disc array controlling device 2 connected to a host computer 1 and a plurality of disc drives 6-1, 6-2, 6-3, . . . , 6-m, 6-n (n=m+1) forming a Redundant Array of Inexpensive (or Independent) Discs (RAID). Details of RAID are explained below. Moreover, the disc array controlling device 2 is provided with a host adapter 3, a disc array controller 4, and a plurality of device adapters (DA) 5-1, 5-2, 5-3, . . . , 5-m, 5-n.

As explained previously, the disc array apparatus 7 is operated through connection to the host computer 1. In this case, the host computer 1 and the host adapter 3 of the disc array controlling device 2 are connected to each other by an interface cable (for example, a SCSI-2 cable). The host adapter 3 executes interface control for the disc array apparatus 7 to the host computer 1, while the disc array controller 4 executes various controls during data read/write operations to the disc drives 6-1 to 6-n. The device adapters (DA) 5-1 to 5-n respectively control the disc drives 6-1 to 6-n during the data read/write operations based upon an instruction from the disc array controller 4.

To the host computer 1, the disc array apparatus 7 appears as a single disc drive. For example, in the disc array apparatus 7 of FIG. 1, when the host adapter 3 receives data (herein after referred to as host data) from the host computer 1, host adapter 3 in turn transmits the host data to the disc array controller 4. The disc array controller 4 divides the data into a plurality of divided data, then stores the divided data into a plurality of disc drives 6-1 to 6-m (which are disc drives allocated to storing data in, for example, RAID level 3) through the device adapters 5-1 to 5-m, generates parity data for the divided data, and stores the parity data in the remaining, single disc drive 6-n (which is a disc drive allocated to parity) via the device adapter 5-n.

As explained above, the disc array apparatus 7 of FIG. 1 realizes a higher number of read/write operations than that of a single disc drive and improves the reliability of the data being read and written by simultaneously dividing a large amount of data for storage data among a plurality of disc drives and by simultaneously reading data from a plurality of disc drives. Therefore, the disc array apparatus 7 of FIG. 1 can realize higher performance than can a single disc drive.

2. Explanation of RAID

RAID is explained in *The RAIDBook, A Source Book for RAID Technology,* Edition 1—1, published by the RAID Advisory Board, St. Peter, Minn., Nov. 18, 1993, and incorporated herein by reference.

A disc array apparatus is a system which realizes higher reliability and performance than that of an individual disc drive by introducing and using a plurality of disc drives (such as hard disc drives) to store data. This disc array apparatus is referred to as RAID (Redundant Array of Inexpensive Disks, or Redundant Array of Independent Disks). RAID was proposed in 1987 by Prof. David A. Patterson of the University of California at Berkeley, and is a name derived from the thesis of Prof. Patterson.

As described previously, the disc array system implementing RAID realizes high speed access of a large amount of data using many disc drives and provides redundancy of data to minimize data loss when a disc drive fails. RAID is classified into levels 1 to 5 (hereinafter, such levels are referred to as, for example, RAID-1, RAID-2, RAID-3, RAID-4, and RAID-5, and as RAID level 1, RAID level 2, RAID level 3, RAID level 4, and RAID level 5, respectively). Parity data used in recovering the data if a disc drive fails is provided in RAID level 3 to RAID level 5 (RAID-3, RAID-4 and RAID-5). In RAID, the dividing of input data and the storing of the input data in corresponding positions across all members of a disc array is referred to as striping.

In RAID level 4 (RAID-4) and RAID level 5 (RAID-5), a plurality of simultaneous read operations is possible and, moreover, in RAID level 5 (RAID-5), a plurality of simultaneous write operations is also possible, resulting in an effective and large amount of transaction processing without dedicating one, particular disc drive to storing parity data.

3. Explanation of RAID levels

FIGS. 2(a) and 2(b) are explanatory diagrams of RAID levels. FIG. 2 (a) shows data transfer (write operation) in RAID-3. FIG. 2 (b) shows data transfer (write operation) in RAID-5. In FIGS. 2(a) and 2(b), disc array apparatus 7 comprises the host adapter 3, the disc array controller 4, a plurality of the device adapters (DA) 5-1, 5-2, 5-3, 5-4 and 5-5, and a plurality of disc drives 6-1 to 6-5.

(1) Explanation of RAID-1

RAID-1 is a mirrored disc structure in which all disc devices storing data are duplicated. In the mirrored disc structure of RAID-1, the same data is written into two disc drives. Therefore, the disc drive configuration of RAID-1 requires two discs for each disc of data stored, and results in double the cost of a non-mirrored disc drive configuration but is most simple in structure and has been used widely. Regarding the performance of RAID-1, the execution time may be slightly increased over that of a single disc drive during a data writing operation because the writing of data is performed to two disc drives. However, since a data read operation is executable in principle when any one of the disc drives is in an idle condition and may read the requested data from either of the disc drives storing the data in RAID-1, performance during reading of data is improved in RAID-1 over performance during the reading of data from a single disc.

(2) Explanation of RAID-2

In RAID-2 level, the input data is divided (striped), and the divided data are distributed and stored into a plurality of disc drives through an interleave process. In RAID-2, a disc drive storing an error correction code for the divided data is defined as a redundant disc drive, and the data stored in such a redundant disc drive is defined as the Hamming code.

Also in RAID-2 level, when four disc drive units are used for storing data, three disc drive units may be required for storing the error correction code. In addition, in RAID-2, four disc drive units storing correction codes are required for ten disc drives used for storing data, and five disc drives storing correction codes are required for 25 disc drives used for storing data. RAID-2 disc drives are characterized in that data is not lost if a fault occurs, even in a plurality of disc drives. Therefore, as explained above, a problem arises with RAID-2 that a plurality of redundant disc drives are required because a substantial amount of data is stored. The substantial amount of data which is stored needs to be reduced.

(3) Explanation of RAID-3

In RAID-3, the input data is divided (through striping), and the divided data is distributed and stored in a plurality of disc drives through an interleave operation. In RAID-3, the disc drive storing the error correction code for the divided data is defined as a redundant disc drive, and the data stored in the redundant disc drive is defined as parity data. Therefore, only one unit of the redundant disc drive (disc drive for parity data) is required for RAID-3, regardless of the number of units of the disc drives storing data, since redundant information is stored on a dedicated parity disc drive in RAID-3.

For example, in RAID-3, as shown in FIG. 2(a), data is read/written in parallel for a plurality of disc drives 6-1 to 6-4. One unit of a disc drive, such as disc drive 6-5 shown in FIG. 2(a), is provided to store parity. The data transfer rate of data between the disc array controller 4 and the disc drives is magnified by N times (in which N is defined as number of units of the disc drives storing data and operated in parallel), and is dependent upon a degree of parallel operation of the disc drives. Moreover, if a fault is generated in one disc drive, performance is not degraded. Further, if a fault occurs during data transfer, the data transfer operation can continue to execute.

(4) Explanation of RAID-4

In RAID-4, the data striping unit (dividing unit) in RAID-3 is organized into units of sectors, and can include 1 or several sectors. In RAID-3, as explained previously, since access is made at one time and in parallel to a plurality of disc drives, a distinctive effect on performance can be seen when access is made to units allowing for a certain degree of parallel operation. It is advantageous, however, for access to occur to small units of data, from the viewpoint of performance, to distribute the access to the individual disc drives. Accordingly, in RAID-4, data is independently written into each disc drive, but parity disc drives also store the parity data generated from the bits of data corresponding to each disc drive. In RAID-4, one parity disc drive stores the parity of the data in corresponding locations in the other, non-parity disc drives.

Therefore, if a fault occurs in one disc drive, data is not lost. The disadvantage is that access must be made to both the data disc drive and the parity disc drive when data is updated. Accordingly, the parity disc drive is considered to be a bottleneck.

(5) Explanation of RAID-5

In RAID-5, to eliminate concentrated access to the parity disc drive, which is a disadvantage of RAID-4, parity data is distributed across all disc drives in the disc array apparatus, such as disc drives 6-1 to 6-5 as shown in FIG. 2(b). However, when data is updated, access is still required to two disc drives. The process of read, generation of data, and write is also necessary because parity data can be generated, in principle, by obtaining a difference from the old data.

In addition, loss of data can be substantially eliminated by using the parity data. However, if one disc array apparatus fails, performance to the level of that of at least the original apparatus cannot be maintained. Performance cannot be maintained because all of the data of the remaining disc drives are used to regenerate the data of the defective disc drive. Therefore, RAID-5 is not suitable for a system like a continuously operating system, such as a fault tolerant system, in which the system as a whole is never stopped due to a fault generated in the disc array apparatus.

An example of the data transfer (write operation) of RAID-5 is shown in FIG. 2(b). As shown in FIG. 2(b), P0, P1, P2 and P3 are parities. Also as shown in FIG. 2(b), different disc drives (6-1 through 6-S, respectively) are used for storing parity for every sector group for generation of parity. Even in RAID-5, a striping unit is organized in units of sectors (1 or several sectors), as in the case of RAID-4.

During a data read operation using RAID-3 and RAID-5, parity data is not used in the conventional disc array apparatus, and the host data (the data to be transferred to the host computer; the host computer is not shown in FIGS. 2(a) or 2(b)) is restructured (recovered) from the data read from the disc drives other than the disc drive storing parity data. The host data is then transferred directly to the host computer. In a RAID-5 disc array apparatus, since a parity check is not executed during the read operation, if the data is varied or lost during the read operation, it cannot be detected, which lowers the reliability of the data. In RAID, stripe-by-stripe regeneration of data and parity is referred to as reconstruction. Therefore, restructuring (or recovery) of data and parity can be from reading the divided data directly from the disc drives storing the divided data, and/or through regeneration (when referring to a disc drive) or through reconstruction (when referring to recovery of data in a stripe across several disc drives).

Furthermore, if one disc drive fails, the host data is restructured (recovered) from the data read from the remaining disc drives other than the defective disc drive. In this case, the recovery of the host data using the parity data in the RAID is executed, in RAID-3 and RAID-5, by carrying out exclusive OR processing on the data of the remaining normal disc drives.

However, the disc array apparatus of the related art is typically not provided with a read parity check function of checking by utilizing the exclusive OR function whether or not matching between data and parity occurs during a data read operation, as in the present invention (which can restructure data even when matching does not occur during a read parity check). Even in an apparatus of the related art having a read parity check function, if matching of the read data does not occur during a read operation, the data to be recovered cannot be transmitted to the host.

For example, since normal RAID-5 functions in the related art do not use the parity disc drive when a read command is executed, RAID data integrity cannot be checked during normal RAID-5 functions in the related art.

Even if someone attempts to check RAID data integrity at the RAID-5 level in the related art, the disc array apparatus of the related art can check only whether the RAID data integrity is acceptable.

Accordingly, the data is lost and the reliability of data in the disc array apparatus of the related art is reduced.

SUMMARY OF THE INVENTION

Therefore, it is an object of the present invention to provide a disc array apparatus establishing a high reliability of data transfer.

It is a further object of the present invention to provide a disc array apparatus which executes a parity check of read data during a data read operation and recovery of host data, even if a contradiction is generated in the comparing of data and parity, to transfer correct data to the host computer at all times.

It is another object of the present invention to provide a disc array apparatus implementing RAID and which executes a parity check of read data during a data read operation and recovery of host data, even if a contradiction is generated in the comparing of data and parity, to transfer correct data to the host computer at all times.

In the present invention, a disc array apparatus comprises a plurality of data memory devices storing data, a first redundancy information memory device storing first redundancy information for the data stored in the plurality of data memory devices, and a second redundancy information memory device storing second redundancy information generated on the basis of the data and the first redundancy information.

The disc array apparatus of the present invention comprises a section generating, when data is stored in the data memory device and first redundancy information is stored in the first redundancy information memory device, relevant data including second redundancy information corresponding to the first redundancy information and to be stored in the second redundancy information memory device. The disc array apparatus of the present invention further comprises a section judging, when the data is read from the plurality of data memory devices, the normality of the data on the basis of the second redundancy information stored in the second redundancy information memory device. In addition, the disc array apparatus of the present invention also comprises a restructuring section designating, when the data is judged to be abnormal, only one memory device among a plurality of memory devices as storing the abnormal data, and restructuring (recovering) the data stored in the designated memory device on the basis of the information stored in the remaining memory devices other than the designated memory device. Further, the disc array apparatus of the present invention comprises a section judging correctness of the restructured (recovered) data on the basis of the first redundancy information stored in the first redundancy information memory device.

According to the present invention, a disc array apparatus implementing RAID level 3 comprises a plurality of disc drives, and a disc array controlling device. The disc array controlling device of the present invention inputs host data, and controls data read and write operations by operating the disc drives in parallel, dividing the host data and to generating, parity data from the divided data, in order to write divided data into a plurality of disc drives for storing data and to write the parity data into one disc drive for parity.

The disc array controlling device of the present invention implementing RAID level 3 further comprises a data write controlling section, a parity checking section, a host data restructuring section, and a cyclic redundancy check information checking section, as explained below.

The data write controlling section of the present invention adds cyclic redundancy check (CRC) information to the host data, divides the host data, including the cyclic redundancy check information, and generates parity data from the divided data to control a write operation to each disc drive. The parity checking section of the present invention generates parity data from the divided data read from the disc drive and performs a parity check by comparing the parity data with the parity data read from the disc drive for storing parity. When contradiction is found in the comparing of data and parity through the parity check executed by the parity checking unit, the host data restructuring section of the present invention sequentially assumes, one disc drive at a time including the plurality of disc drives storing data and the disc drives storing parity, that one of the disc drives is storing erroneous data, and sequentially reconstructs (regenerates), under this assumption, the host data from the data of the disc drives other than the disc drives storing the erroneous data.

Further, when a mismatch is found by the cyclic redundancy check information check executed on the host data restructured (reconstructed) by the host data restructuring unit, the cyclic redundancy check information checking section of the present invention assumes that the disc drive assumed by the host data restructuring section to be storing erroneous data is different than the relevant disc drive (i.e., the disc drive storing the host data on which the cyclic redundancy check information check is being executed), and repeats the cyclic redundancy check information check on, for example, the host data stored in the disc drive adjacent to the above-mentioned currently relevant disc drive, under this assumption again, on the restructured (recovered) host data until matching occurs. When matching occurs, the cyclic redundancy check information checking section of the present invention defines such host data as the correct host data.

In addition, according to the present invention, a disc array apparatus implementing RAID level 3 comprises a plurality of disc drives, and a disc array controlling device controlling data read and write operations to operating the disc drives in parallel. The disc array controlling device of the present invention divides host data input to the disc array controlling device and generates parity data from the divided data, in order to write the divided data into a plurality of disc drives for data and to write the parity data into one disc drive for parity.

The disc array controlling device of the present invention implementing RAID level 3 further comprises a data write controlling section, a parity checking section, and a host data restructuring section, as explained below. The data write controlling section divides the host data, generates parity data from the divided data, and adds time data to the divided data and the parity data, to control the write operation to the disc drive. The parity checking section of the present invention generates parity data from the divided data read from the disc drive and executes a parity check by comparing the parity data with the parity data read from the disc drive for storing parity. The host data restructuring section compares, when contradiction is found in the matching of data and parity through the parity check by the parity checking unit, time data stored in all of the disc drives to define the data having the oldest time as erroneous data, and recovers the host data from the data of all of the disc drives other than the disc drive storing the erroneous data.

Also according to the present invention, a disc array apparatus implementing RAID level 5 comprises a plurality of disc drives and a disc array controlling device. The disc array controlling device controls data read and write operations by operating in parallel the disc drives, dividing input host into units of a sector and generating parity data from the divided data, in order to write the parity data to one disc drive cyclically selected from all of the disc drives and to write distributively the divided data to all of the disc drives other than the disc drive to which the parity data is written.

The disc array controlling device of the present invention further comprises a data write controlling section, a parity checking section, and a host data restructuring section, as explained below. The data write controlling section of the present invention divides the host data into units of a sector, generates parity data from this divided data, and adds time data to the divided data and parity data, in order to control the data writing operation to the disc drives. The parity checking section of the present invention generates parity data from the divided data read from the disc drives, and compares the subject parity data with the parity data read from the disc drives, in order to execute a parity check. The host data restructuring section of the present invention compares, when contradiction is found in matching the above-mentioned data and parity by the parity check executed by the parity checking unit, the time data stored in all of the disc drives, in order to define the data having the oldest time data as erroneous data and restructure host data from the data of all of the disc drives other than the disc drive storing the erroneous data.

Further according to the present invention, a disc array apparatus implementing RAID level 1 comprises at least one pair (two units) of disc drives, and a disc array controlling device. The disc array controlling device of the present invention controls data write/read operations by operating the two disc drives in parallel, in order to write the input host data into each of the two units of disc drives using the disc array controlling device. The disc array controlling device of the present invention further comprises a data write controlling section controlling the writing of the host data with the addition of time data to the disc drives, and a data read controlling section comparing the data read from the two units of disc drives and searching, when these data are mismatched, the time data stored in the two units of disc drives to define the data having the latest time data as the correct data.

In addition, according to the present invention, a disc array apparatus implementing RAID level 3 comprises a plurality of disc drives, and a disc array controlling device. The disc array controlling device of the present invention comprises a host adapter, a memory coupled to the host adapter, a disc array controller, device adapters, and memory coupled to each, respective device adapter. The disc array controller of the present invention comprises a parity processing section, a counter data processing section, and an update (renew) counter. The foregoing disc array apparatus implementing RAID level 3 is explained in detail herein below.

In addition, in a disc array apparatus of the present invention implementing RAID level 5, a counter value from the update counter can be used in place of the time data in the above-mentioned disc array apparatus of the present invention implementing RAID level 5.

Further, in a disc array apparatus of the present invention implementing RAID level 1, a counter value from the update counter can be used in place of the time data in the above-mentioned apparatus implementing RAID level 1.

The above and further objects and features of the invention will be more fully apparent from the following detailed description with accompanying drawings, wherein like numerals refer to like parts throughout.

DETAILED DESCRIPTION OF THE PREFERRED EMBODIMENTS

Figure 1:
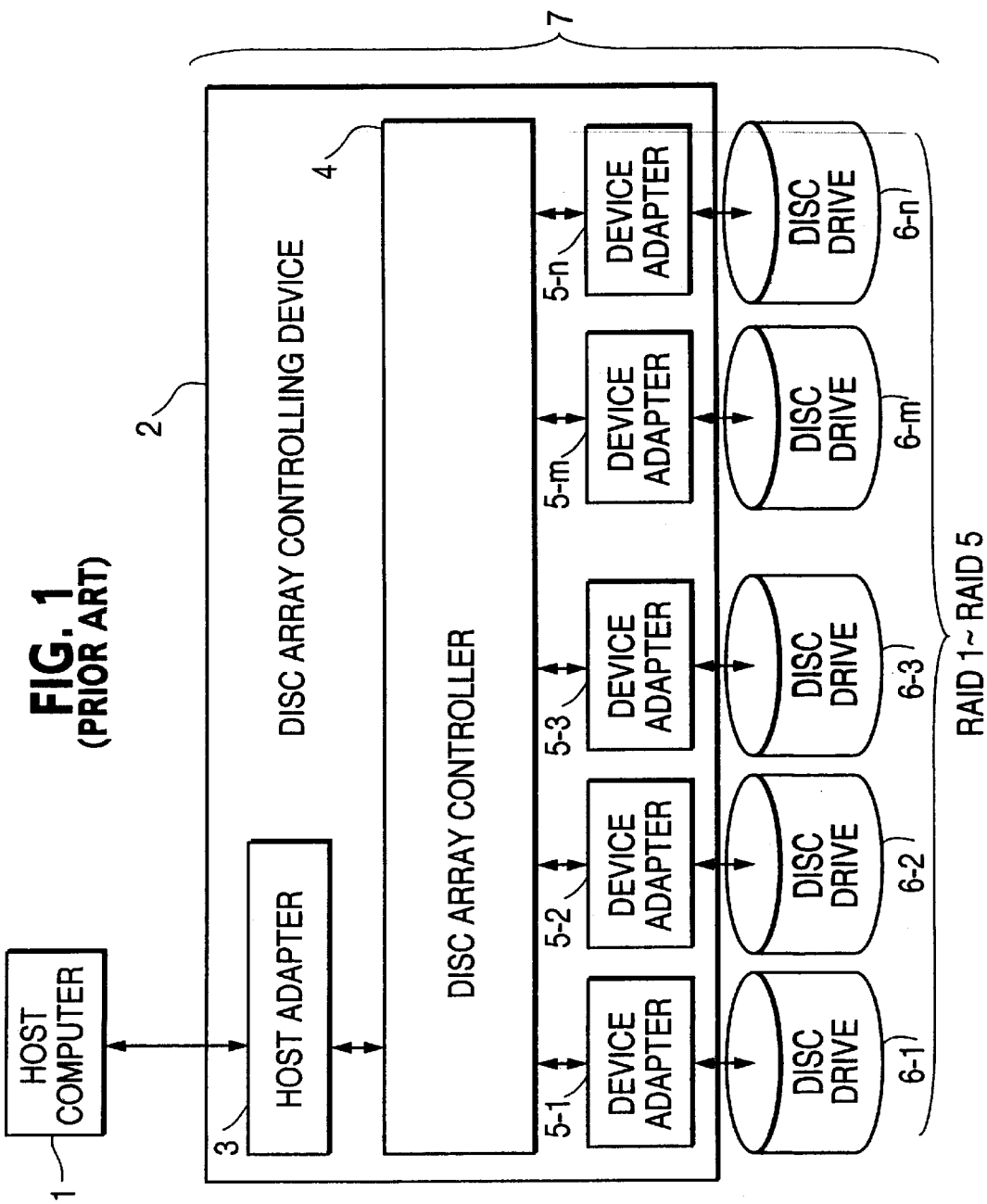
FIG. 1 is an explanatory diagram of the disc array apparatus of the related art.
Figure 2A:
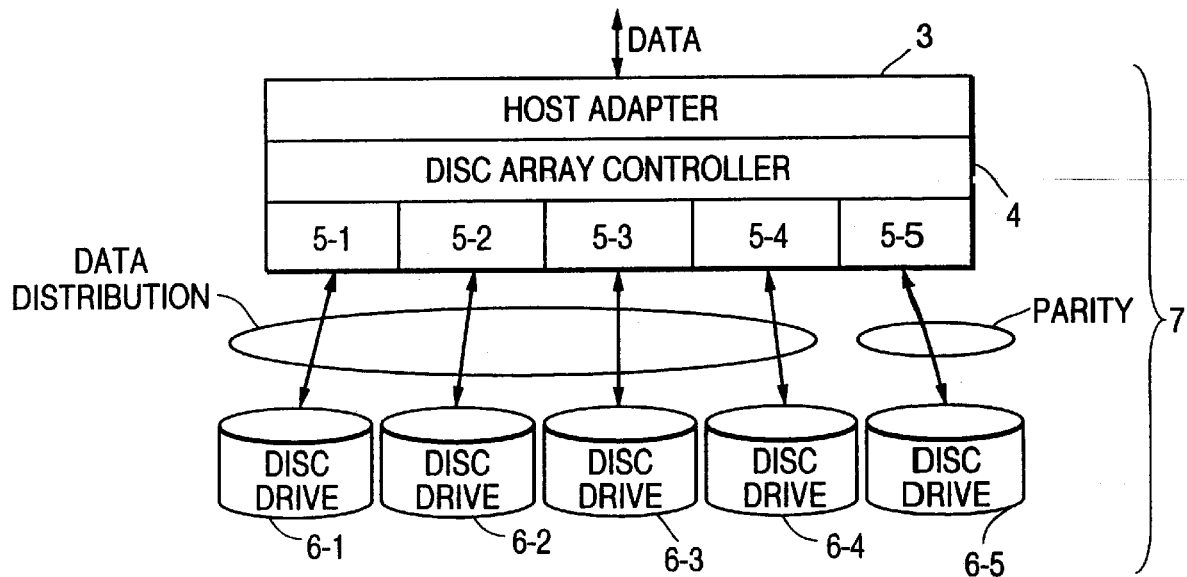
FIGS. 2(a) and (b) are explanatory diagrams of RAID levels in a disc array apparatus of the related art.
Figure 2B:
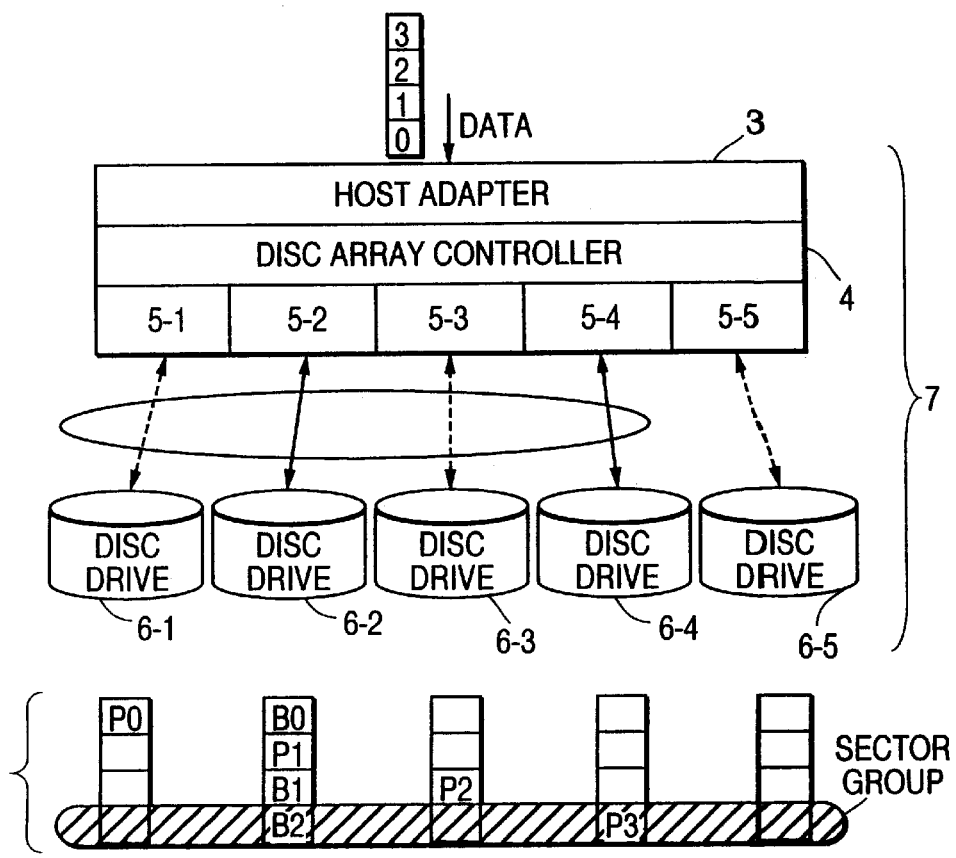
Figure 3:
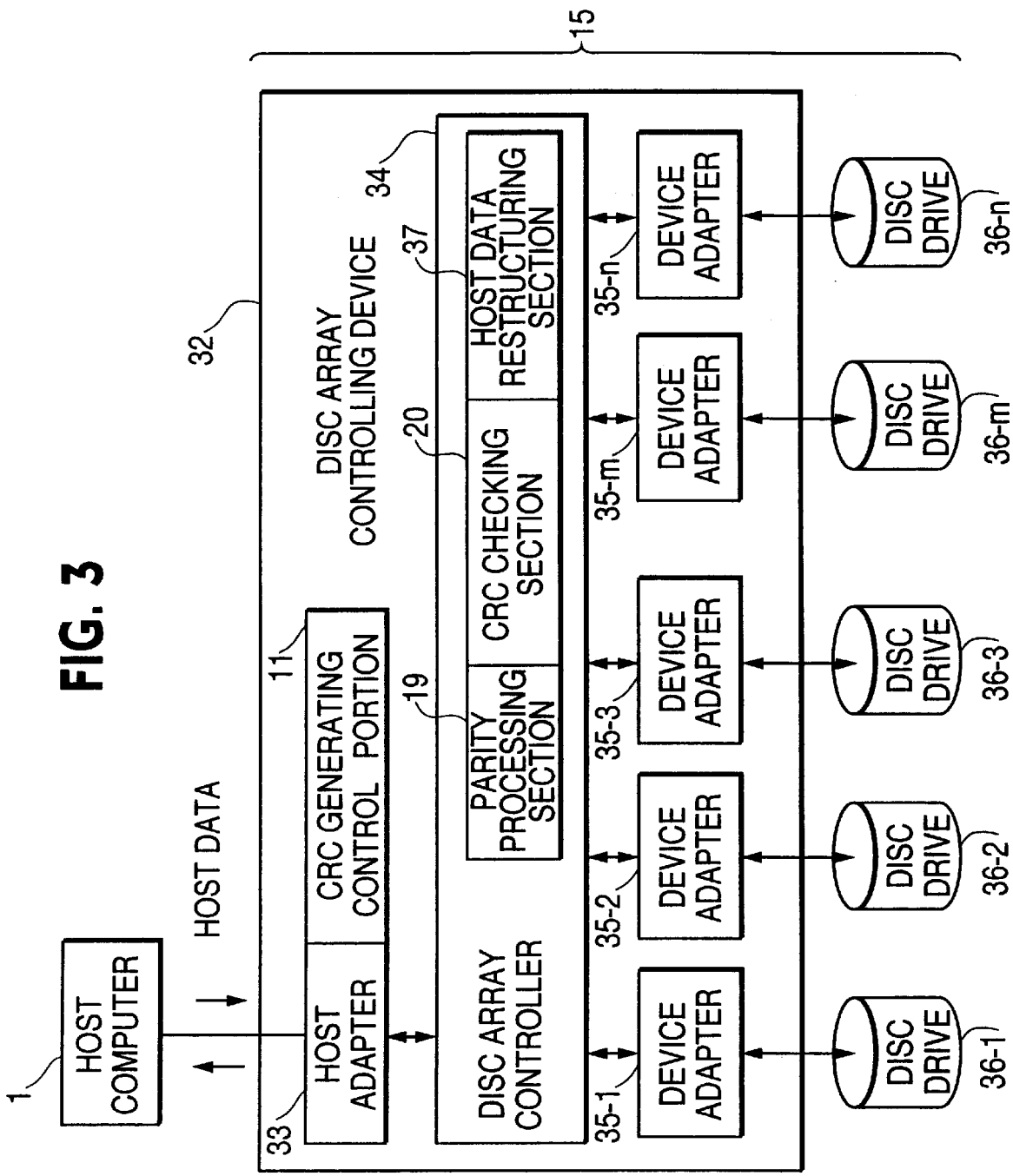
FIG. 3 is an explanatory diagram of the present invention.

FIG. 3 is an explanatory diagram of the present invention. The principle of operation of each embodiment of the present invention is described below, with reference to FIG. 3, and the details of the operation of each embodiment of the present invention are described herein below with reference to FIGS. 4–17.

A disc array apparatus 15 of RAID level 3 of the present invention comprises a plurality of disc drives 36-1 to 36-n and a disc array controlling device 32, as shown in FIG. 3. The disc array controlling device 32 of the present invention, as shown in FIG. 3, receives host data from host computer 1. The disc array controlling device 32 controls data read and write operations to the disc drives 36-1 to 36-n by operating the disc drives 36-1 to 36-n in parallel to divide the host data transferred from the host computer 1 and to generate parity data from the divided data, in order to write the divided data into a plurality of disc drives 36-1 to 36-m dedicated to storing data and to write the parity data into one disc drive 36-n dedicated to storing parity.

The disc array controlling device 32 of the present invention shown in FIG. 3 further comprises a data write controlling section, a parity checking section, a host data restructuring section, and a cyclic redundancy check information checking section, as explained below with reference to FIG. 3.

The data write controlling section is shown as the CRC generating control portion 11 in FIG. 3. The data write controlling section adds a cyclic redundancy check information (herein after referred to as CRC) to the host data, divides the host data, which is coupled with CRC, and generates parity data from the divided data to control the write operation to each disc drive 36-1 to 36-n.

The parity checking section (which is shown as the parity processing section 19 in FIG. 3) generates parity data from the divided data read from the disc drives 36-1 to 36-m to perform a parity check by comparing the generated parity data with the parity data read from the disc drive storing parity 36-n.

The host data restructuring section 37 is part of the disc array controller 34 shown in FIG. 3. The restructuring functions executed by the host data restructuring section 37 are explained generally with respect to FIG. 3. The respective restructuring functions, explained below in particular to each embodiment of the present invention, of the host data restructuring section are executed by, and the host data restructuring section can also be shown as part of, the disc array controller 44 in FIG. 4, the disc array controller 54 in FIG. 7, the disc array controller 64 in FIG. 10, the disc array controller 74 in FIG. 12, the disc array controller 84 in FIG. 14, the disc array controller 94 in FIG. 16, and the disc array controller 104 in FIG. 17.

The host data restructuring section 37 shown in FIG. 3 assumes, when contradiction is found in matching of the above-mentioned data in the parity check by the parity checking section, that erroneous data is sequentially stored in the plurality of disc drives storing data 36-1 to 36-m and the disc drive storing parity 36-n. The host data restructuring section 37 sequentially restructures (recovers), under the foregoing assumption, the host data from the data of the disc drives other than the disc drives storing the erroneous data.

The cyclic redundancy check information checking section of the present invention (which is shown as the CRC checking section 20 in FIG. 3) executes cyclic redundancy check information checking (a CRC check) on the host data recovered by the host data restructuring section. When a mismatch is found by the CRC check, the CRC checking section 20 assumes that the disc drive which has been assumed by the host data restructuring section 37 to be storing erroneous data is different than the relevant disc drive (the disc drive storing data on which the CRC check is performed), repeats the cyclic redundancy check information checking (for example, on a disc drive adjacent to the relevant disc drive), also under the foregoing assumption, on the recovered host data until matching occurs, and defines, when matching is realized, such host data as the correct host data.

In the disc array apparatus 15 of RAID level 3 explained above and shown in FIG. 3, the disc array apparatus 15 (through the data writing section, for example, the CRC generating control portion 11) adds CRC information to the host data transferred from the host computer 1 during a data write operation, divides the host data coupled with the CRC, and generates parity data from this divided data. The divided data is written into disc drives 36-1 to 36-m, and parity data is written into disc drive 36-n.

Next, during a data reading operation, the parity checking section (the CRC checking station 20 shown in FIG. 3) generates read parity data from the divided data read from disc drives 36-1 to 36-m, and compares the above-mentioned read parity data with the parity data read from the disc drive 36-n storing, to execute a read parity check. The result of the foregoing matching is referred to as the matching property.

When contradiction is found in the matching property within the read parity check by the parity checking section 19, the host data restructuring section assumes that erroneous data is sequentially stored one by one in all disc drives 36-1 to 36-n. The host data restructuring section 37 sequentially restructures, under this assumption, the host data from the data of all disc drives other than the disc drive which has been assumed to be storing erroneous data.

When the CRC check is performed on the host data restructured by the host data restructuring section 37 and matching cannot be attained as a result of the CRC check, the cyclic redundancy check information checking section (the CRC checking station 20 shown in FIG. 3) assumes the disc drive which has been assumed to be storing erroneous data by the host data restructuring section is another disc drive. The CRC checking station 20 then repeatedly executes, under this assumption, the CRC check on the host data restructured again from the another disc drive until matching is attained. When matching is attained in the above-mentioned CRC check, the CRC checking station 20 then defines the host data as the correct data.

Thereafter, the host data is transferred to the host computer 1 via the host adapter 33.

Accordingly, in the present invention, even if matching cannot be attained in the read parity check in the disc array apparatus of RAID level 3, the correct host data can always be restructured by the CRC check and can then be transferred to the host computer 1. Therefore, reliability of data is improved in the present invention.

As shown in FIG. 3, a disc array apparatus of RAID level 3 comprises a plurality of disc drives 36-1 to 36-n and a disc array controlling device 32. The disc array controlling device 32 controls data read and write operations by operating in parallel the disc drives 36-1 to 36-n to divide host data transferred from the host computer 1 by the disc array controlling device 32 and to generate parity data from the divided data. Disc array controlling device 32 then writes the divided data into a plurality of disc drives dedicated to storing data 36-1 to 36-m, and writes the parity data into one disc drive dedicated to storing parity 36-n.

The disc array controlling device 32 further comprises a data write controlling section, a parity checking section, and a host data restructuring section, as explained below.

The data write controlling section of the present invention comprises host adapter 33, disc array controller 34, and a part of device adapters 35-1 to 35-n, and divides the host data, generates parity data from the divided data, and adds time data to the divided data and parity data, to control the write operation to the disc drive.

The parity checking section is a part of the parity processing section 19 and generates parity data from the divided data read from these disc drives 36-1 to 36-m, and executes a parity check by comparing the parity data with the parity data read from the disc drive dedicated to storing parity 36-n.

When contradiction is found in matching of the parity checks by the parity checking section 19, the host data restructuring section 37 compares the time data stored in all disc drives 36-1 to 36-n to define the data having the oldest time as erroneous data. The host data restructuring section 37 then restructures the host data from the data of all disc drives other than the disc drive storing the erroneous data.

In the disc array apparatus of RAID level 3 of the present invention having a structure explained above, during the data writing operation, the data write controlling section divides the host data transferred to the host computer 1, generates parity data from the divided data, and adds time data to each divided data and parity. The divided data, including the time data, is written into the disc drives 36-1 to 36-m (disc drives dedicated to storing data), and the parity data, also including the time data, is written into the disc drive 36-n (the disc drive dedicated to storing parity).

During the data reading operation, the parity checking section generates the read parity data from the divided data read from the disc drives 36-1 to 36-m and compares this read parity data with the parity data read from the disc drive storing parity 36-n, to execute the read parity check.

When contradiction is found in the matching property as a result of comparison, the host data restructuring section 37 compares the time data stored in all disc drives 36-1 to 36-n, defines the data having the oldest time data as the erroneous data and restructures the host data from the data stored in all disc drives other than the disc drive storing such erroneous data. Thereafter, the restructured host data is transferred to the host computer 1 via the host adapter 33.

As explained above, even if matching cannot be attained by the read parity check in the disc array apparatus of RAID level 3, the correct host data can always be restructured and can be transferred to the host computer 1. Accordingly, in the present invention, reliability of data is improved over that of the related art.

Also as shown in FIG. 3, a disc array apparatus of RAID level 5 comprises a plurality of disc drives 36-1 to 36-n and a disc array controlling device 32. The disc array controlling device 32 of the present invention controls data read and write operations by operating in parallel the disc drives 36-n to 36-n to divide input host data transferred from host computer 1 into units of sectors and generate parity data from the divided data, in order to write the parity data to one disc drive cyclically selected from all disc drives 36-1 to 36-n and distributively write the divided data to all disc drives other than the disc drive to which the parity data is written.

The disc array controlling device 32 of the present invention further comprises data a write controlling section, a parity checking section, and a host data restructuring section, as explained below.

The data write controlling section comprises host adapter 33, disc array controller 34, and a part of device adapters 35-1 to 35-n, and divides the host data into units of sectors, generates parity data from this divided data, and adds time data to the divided data and parity data to control the data writing operation to the disc drives.

The parity checking section, shown as the parity processing section 19 in FIG. 3, generates parity data from the divided data read from the disc drives and compares this parity data with the parity data read from the disc drives to execute the parity check.

The host data restructuring section 37 comprises a part of the disc array controller 34, and compares, when contradiction is found in the matching through the parity check by the parity checking section, the time data stored in all disc drives 36-1 to 36-n to define the data having the oldest time as erroneous data, and restructures host data from the data of all disc drives other than the disc drive storing the erroneous data.

In the disc array apparatus of RAID level 5 of the present invention, the data write controlling section divides the host data transferred from the host computer 1 into units of sectors and generates parity data from the divided data. Moreover, the time data is added to the divided data and parity data to control the write operation to the disc drives.

During the data reading operation, the parity checking section generates read parity data from the divided data read from the disc drive and compares this read parity data with the parity data read from the disc drive, to execute the read parity check. The host restructuring section compares, when contradiction is found in the matching property by the read parity check, the time data stored in all disc drives 36-1 to 36-n and defines the data having the oldest time data as the erroneous data to restructure the host data from the data of all disc drives other than the disc drive storing the erroneous data. Thereafter, the restructured host data is transferred to the host computer 1 via the host adapter 33.

As explained above, if matching cannot be attained by the read parity check in the disc array apparatus of RAID level 5, the correct host data can always be restructured and can be transferred to the host computer 1 by checking the time data. Accordingly, in the present invention, the reliability of data is improved over that of the related art.

In the present invention, a disc array apparatus of RAID level 1 comprises at least one pair of two units of disc drives 36-1 and 36-2 and a disc array controlling device 32. The disc array controlling device 32 controls data write/read operations by operating in parallel these disc drives to write the host data transferred from the host computer 1 into the two units of disc drives 36-1, 36-2 with the disc array controlling device 32.

The disc array controlling device 32 further comprises a data write controlling section, which comprises host adapter 33, disc array controller 34 and a part of the two units of disc drives 36-1 and 36-2. The data write controlling section controllably writes the data with the addition of time data to the disc drives 36-1 and 36-2.

The disc array controlling device of the present invention further comprises a data read controlling section. The data read controlling section of the present invention comprises disc array controller 34 and a part of the device adapters 35-1 to 35-n. The data read controlling section of the present invention compares the data read from the two units of disc drives 36-1 and 36-2 and searches, when these data are mismatched, the time data stored in the two units of disc drives 36-1 and 36-2 to define the data having the latest time as the correct data.

During the data writing operation in the disc array apparatus of RAID level 1, the data write controlling section adds the time data to the host data transferred from the host computer 1 and controls the writing operation to the two units of the disc drives 36-1 and 36-2. As explained above, the same host data with time data are written into the two units of the disc drives 36-1 and 36-2.

Next, during the data reading operation, the data read controlling section compares the data read from two units of disc drives 36-1 and 36-2. As explained above, when these data are mismatched, the data having the latest time is defined as the correct host data, and thereafter, the correct host data is transferred to the host computer 1 via the host adapter 33.

Also as explained above, even if the data read from the two units of the disc drives are mismatched in the disc array drive of RAID level 1, the correct host data can always be restructured and transferred to the host computer 1 by checking the time data. Therefore, reliability of data is improved in the present invention over that of the related art.

In addition, the present invention is a disc array apparatus comprising a disc array controlling device executing a read parity check of data stored in disc drives consistently with RAID level 3, and restructuring data read from the disc drives based upon a counter value output by an update counter, instead of upon time data, as described above.

Further, the present invention is a disc array apparatus comprising a disc array controlling device executing a read parity check of data stored in disc drives consistently with RAID level 5, and restructuring data read from the disc drives based upon a counter value output by an update counter, instead of upon time data, as described above.

In addition, the present invention is a disc array apparatus comprising a disc array controlling device executing a read parity check of data stored in disc drives consistently with RAID level 1, and restructuring data read from the disc drives based upon a counter value output by an update counter, instead of upon time data, as described above.

In general, a disc array apparatus of the present invention comprises a disc array controlling section (such as disc array controlling device 32). The disc array controlling section comprises, for controlling a plurality of memory devices, a plurality of data memory devices (for example, disc drives 36-1 to 36-m) to store data, a first redundancy information memory device (for instance, any one of the disc drives 36-1 to 36-m) for storing first redundancy information (for instance, host CRC, which is CRC added to the host data by the disc array controlling device) added to a plurality of data stored in a plurality of data memory devices, and a second redundancy information memory device (for instance, disc drive 36-n) for storing second redundancy information (for instance, parity data) generated on the basis of a plurality of data and the first redundancy information.

The disc array controlling section of the present invention further comprises a section (for instance, a part of a parity processing section) generating, when storing data into the data memory device and first redundancy information (for instance, host CRC) into the first redundancy information memory device, the relevant data and second redundancy information (for instance, parity data) for the first redundancy information to be stored into the second redundancy information memory device.

In addition, the disc array controlling section of the present invention comprises a section (a part of the parity processing section 19) for judging, when reading the data from the plurality of data memory devices, normality of the data on the basis of the second redundancy information stored in the second redundancy information memory device.

Further, the disc array controlling section of the present invention comprises a restructuring section (a part of the disc array controller 34) designating, when the data is judged abnormal, only one memory device among a plurality of memory devices and restructuring data stored in the designated memory device on the basis of the information stored in the remaining memory devices other than the designated memory device.

Also, the disc array controlling section of the present invention comprises a section (for instance, CRC checking section 20) judging matching (a judging section) of the restructured data on the basis of the first redundancy information stored in the first redundancy information memory device.

Furthermore, the disc array apparatus as explained above comprises a controlling section sequentially executing restructuring of data by the restructuring section and judgment of the matching of data by the judging section on a plurality of memory devices.

The disc array controlling device of the present invention adds, at the time of writing of the data, the first redundancy check information to the host data transferred from the host computer 1, and divides this host data having the first redundancy information to generate the second redundancy information from this divided data. The divided data is written into a plurality of data memory devices and the second redundancy information is written into the second redundancy information memory device.

Next, during the data reading operation, the disc array controlling device generates the second redundancy information from the divided data read from a plurality of data memory devices and compares this second redundancy information with the second redundancy information read from the second redundancy information memory device.

If contradiction is found in the matching property by judgment of the matching property, the restructuring section assumes that erroneous data is stored sequentially one by one in all disc drives and sequentially restructures, under this assumption, the host data from the data of all disc drives other than the disc drive which is assumed to be storing erroneous data.

The controlling section explained above judges the matching property for the host data restructured by the restructuring section, then assumes, if matching cannot be attained, that the disc drive which has been assumed by the restructuring section to be storing erroneous data is another disc drive. The controlling section then repeats the check again, under this assumption, for the restructured host data with the second redundancy information until matching can be attained. Then, the controlling section defines, when matching is attained in the above check, the relevant host data as the correct host data. Thereafter, this host data is transferred to the host computer 1 via the host adapter 33.

As explained above, even if matching cannot be attained by the check with the second redundancy information in the disc array apparatus, the correct host data can always be restructured and can be transferred to the host computer 1. Therefore, reliability of data is improved in the present invention over that of the related art.

The preferred embodiments of the present invention are explained in detail with reference to the accompanying drawings. For all of the embodiments of the present invention, the following explanation is applicable.

Mismatching during the read parity check is generated in the disc array apparatus when a unit of the disc drive forming the RAID configuration does not return correct data for a particular reason. Particularly when a write command is transmitted to a disc drive, the write data may not actually be written into a memory medium of the disc drive, but the disc drive returns in some cases normal end information. In such a case, for the current read command, the disc drive returns, without any check, data (in the related art) which has not been written accurately by the preceding write command without any check. If such data is transferred to the disc array controller for a parity check, matching cannot be attained.

In the present invention, data can be recovered (hereinafter also referred to as restructured) utilizing the characteristics of RAID, and data can be restructured when a defective disc drive is detected. However, the disc array controller 4 in the related art cannot detect in which disc drive the erroneous data is written.

Therefore, the disc drive in which erroneous data is written is discriminated (determined) by executing the processes of first through seventh embodiments of the present invention, which are explained below, the data of such a discriminated disc drive is defined as defective (erroneous data), and the host data is restructured from the other data, utilizing the data restructuring functions of RAID.

Hereinafter, each embodiment of the present invention will be explained. CRC means Cyclic Redundancy Check explained below and the check information to be added for the cyclic redundancy check is referred to only as CRC. Moreover, the data transferred to the disc array apparatus side from the host computer (the write data) is referred to only as host data, while the data stored in the disc drive (the divided) data) is referred to as disc data, and the data restructured from the data read from the disc drive and transferred to the host computer is referred to as restructured host data or only as host data.

1. The First Embodiment of the Present Invention

Figure 4:
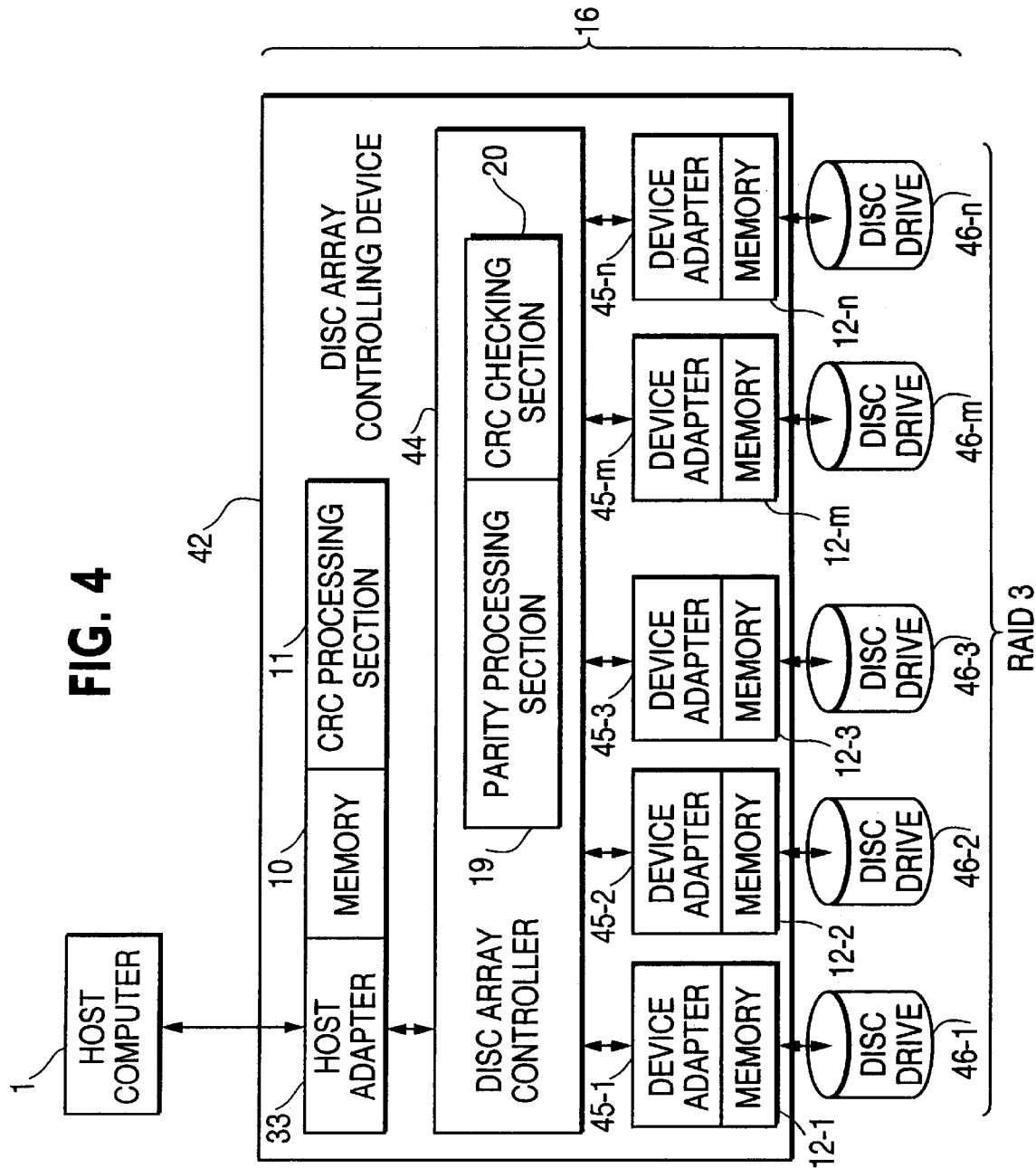
FIG. 4 is a structural diagram of the apparatus of a first embodiment of the present invention.

FIG. 4 is a structural diagram of the first embodiment of the present invention. As shown in FIG. 4, a disc array apparatus 16 comprises a disc array controlling device 42 connected to a host computer 1, and a plurality of disc drives (magnetic disc drives or other hard disc drives, such as rewritable optical drives) 46-1 to 46-n (where n refers to the number of units of disc drives) connected to the disc array controlling device 42.

Moreover, the disc array controlling device 42 comprises a host adapter 33, a disc array controller 44 and a plurality of device adapters 45-1 to 45-n.

The host adapter 33 comprises a memory 10 and a CRC processing section 11, while the disc array controller 44 comprises a parity processing section 19 and a CRC checking section 20, and the device adapters 45-1 to 45-n respectively comprise memories 12-1 to 12-n.

The respective functions of the foregoing sections of the disc array apparatus 16 are explained below. The disc array controlling device 42 executes various controls to the disc array apparatus 16. The disc drives 46-1 to 46-n comprise therein memory media (magnetic discs or rewritable optical discs) to execute data read/write operations depending on the commands transmitted through the device adapters 45-1 to 45-n. The host adapter 33 executes interface control of the disc array apparatus 16 to the host computer 1, for example, reception of commands and transmission/reception of host data. The disc array controller 4 executes various controls and processes during the data read/write operations. The device adapters 45-1 to 45-n control the disc drives 46-1 to 46-n depending upon the instruction from the disc array controller 44. The memory 10 is a working memory accessible by the host adapter 33. The CRC processing section 11 executes adds CRC to the host data. The parity processing section 19 generates parity data and executes a parity check. The CRC checking section 20 executes a CRC check for the host data restructured from the read data. The memories 12-1 to 12-n are working memories accessible respectively by the device adapters 45-1 to 45-n.

The first embodiment of the present invention is particularly effective for executing the process in the RAID 3 level. Therefore, in this example, the process is executed by the disc array apparatus of RAID 3 shown in FIG. 4. During the data write operation, CRC is added to the host data received from the host computer 1, this host data with CRC is divided into a plurality of data, and the parity data is generated from these divided data.

The divided data and parity data are transmitted to the disc drives 46-1 to 46-n via the disc array controller 44 and device adapters 45-1 to 45-n to be written into a recording medium of the disc drive. In this case, the divided data is written into the disc drives 46-1 to 46-m, while the parity data is written into the disc drive 46-n.

Moreover, if a matching result, as explained below, is inconsistent as a result of read parity check with the parity stored in the disc drives 46-1 to 46-n of RAID 3 level during the read operation from the disc drives 46-1 to 46-n, the host data is restructured (recovered) in the RAID 3 level using the host CRC. Accordingly, when mismatching of read parity occurs, the disc array controller 44 attempts to restructure the host data under the assumption that the data stored in the disc drive at the extreme end may be erroneous. The data for which the correct host CRC is calculated is defined as the correct host data and is then transferred to the host computer 1.

Figure 5:
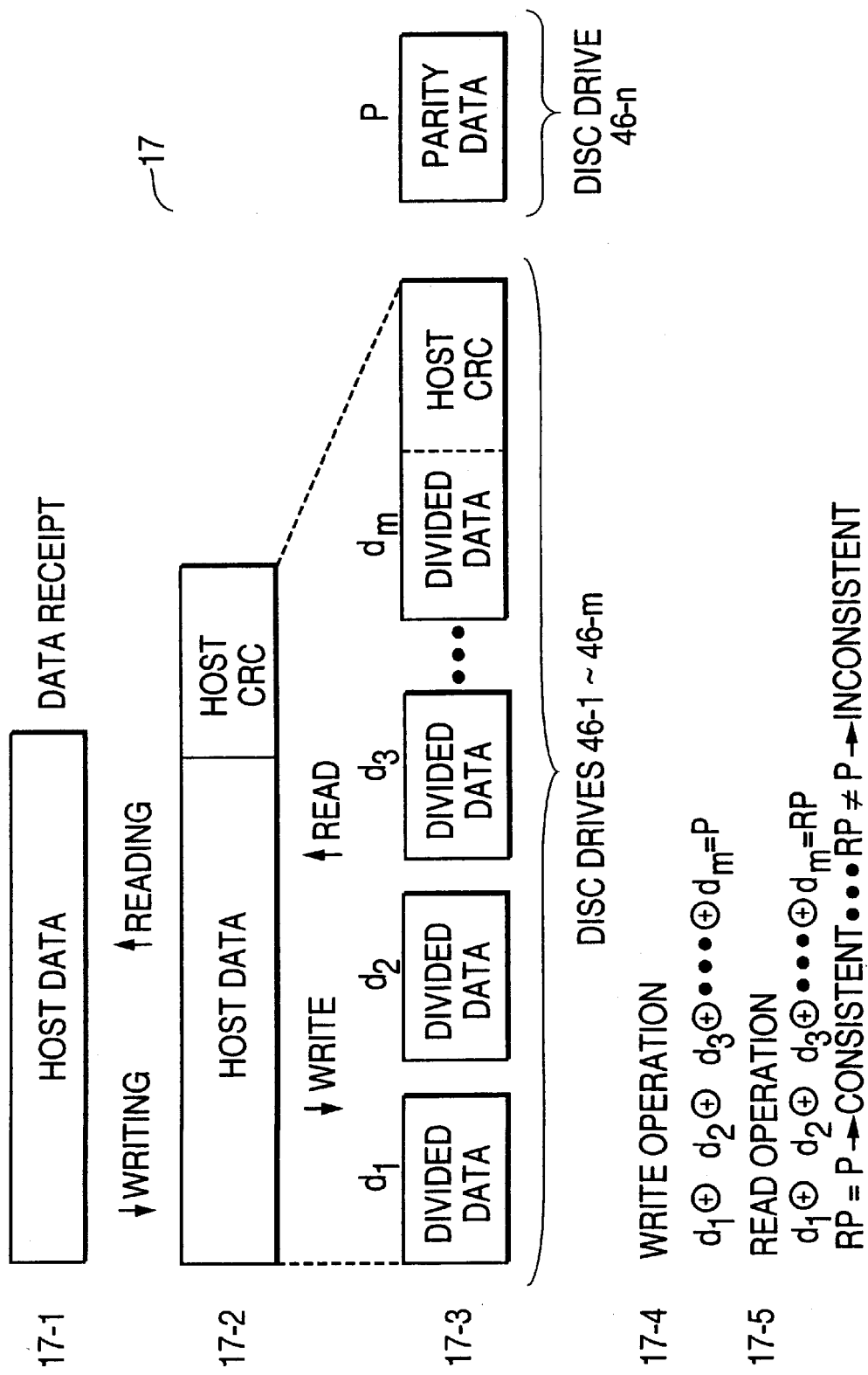
FIG. 5 is an explanatory diagram of processes in the first embodiment of the present invention.

FIG. 5 is an explanatory diagram for the process in the first embodiment of the present invention. The process of the first embodiment of the present invention are explained with reference to FIG. 5.

The processes 17 of the data write operation in the RAID 3 level are as follows. In this case, consistent with RAID 3, the disc drives 46-1 to 46-m are used for storing divided data and the disc 46-n for storing parity. The data read/write operations will be executed as follows.

First, upon reception of the host data requested to be written together with the write command from the host computer 1, the host adapter 33 tentatively stores such host data into the memory 10 (refer to 17-1 of FIG. 5). The CRC processing section 11 shown in FIG. 4 generates the host CRC (CRC check information) from the host data stored in the memory 10 to add the host CRC to the host data (refer to 17-2 of FIG. 5).

Next, the host adapter 33 shown in FIG. 4 transfers the host data including the CRC to the disc array controller 44. Upon reception of the host data including the CRC, the disc array controller 44 divides the host data including the CRC into the m pieces of data based on RAID 3 and generates the data to be allocated to the disc devices 46-1 to 46-m (refer to 17-3 of FIG. 5). Moreover, the parity processing section 19 generates the parity data by conventionally calculating the exclusive OR of the m pieces of divided data.

Where the divided data obtained by dividing the host data having CRC are defined as $d_1, d_2, d_3, \ldots d_m$, and where the parity data is defined as P, the parity data P becomes equal to exclusive OR of the divided data $d_1, d_2, d_3, \ldots d_m$ (refer to 17-4 of FIG. 5).

Next, the disc array controller 44 issues a write command to the disc drives 46-1 to 46-n and transfers the divided data of each disc drive generated as explained above to the device adapters 45-1 to 45-m. Simultaneously, the parity data is transferred to the device adapter 45-n. These data are tentatively stored in the memories 12-1 to 12-n in the device adapter.

Thereafter, the device adapters 45-1 to 45-m transmit a write command to the disc drives 46-1 to 46-m connected thereto and also transfers the divided data thereto. The disc drives 46-1 to 46-m write the divided data into a memory medium of the disc drives (which is referred to as writing of disc data). Moreover, the device adapter 45-n sends a write command to the disc drive 46-n and also transfers the parity data thereto, while the disc drive 46-n writes the parity data to the memory medium of the disc drive (refer to 17-3 of FIG. 5).

Processes which are executed in the first embodiment of the present invention when no contradiction is found in the matching of parity during read operation of RAID-3 level are as follows. First, when the host adapter 33 receives the read command issued by the host computer 1, the host adapter 33 transmits this command to the disc array controller 44. The disc array controller 44 having received this information issues a read command to the disc drives 46-1 to 46-n with the address requested from the host computer 1.

The disc drives 46-1 to 46-n having received the read command via the device adapters 45-1 to 45-n read the data of the designated address. The data read from the disc drives 46-1 to 46-n is transferred to the device adapters 45-1 to 45-n connected to the disc drives 46-1 to 46-n and are then stored respectively in the memories 12-1 to 12-n.

Under this condition, the divided data read from the disc drives are stored in the memories 12-1 to 12-m, while the parity data read from the disc drive is stored in the memory 12-n. Thereafter, the disc array controller 44 restructures (recovers) the host data using the divided data stored in the memories 12-1 to 12-m shown in FIG. 4.

In this case, the parity processing section 19 of disc array controller 44 obtains the read parity by calculating exclusive OR of the divided data stored in the memories 12-1 to 12-m and compares this read parity with the parity stored in the memory 12-n to execute the read parity check. In this case, when the divided data stored in the memories 12-1 to 12-m are defined as $d_1, d_2, d_3, \ldots d_m$, the parity data stored in the memory 12-n as P and the read parity data calculated from the divided data $d_1, d_2, d_3, \ldots d_m$, as RP, the read parity data RP becomes equal to the exclusive OR of the divided data $d_1, d_2, d_3, \ldots d_m$.

When the read parity check provides the result of RP=P, there is no contradiction the matching (refer to 17-5 of FIG. 5). When the parity data are matched (RP=P) as a result of the read parity check, the read parity check is judged to be completed normally, indicating that there is no contradiction in the matching of the read data, and data read from the disc drives 46-1 to 46-m and stored in the respective memories 12-1 to 12-m is transferred to the host adapter 33. Thereafter, the host adapter 33 transfers the data to the host computer 1.

As explained above, when mismatching is detected, during the data read from the disc drives, between the read parity RP calculated from the exclusive OR of the divided data stored in the memories 12-1 to 12-m of the device adapters 45-1 to 45-m and the parity data P stored in the memory 12-n of the device adapter 45-n, in the related art only the mismatching of parity has been transmitted to the host computer 1 because the host data cannot be restructured with the apparatus of the related art.

However, in the first embodiment of the present invention, data can be restructured using the host CRC data having been added to the host data. In this case in the present invention, in principle, if mismatching of parity is detected, it is often probable that the erroneous data is stored in the memory of any one device adapter and it is rather low in probability that erroneous data is stored in the memories of two or more device adapters.

Therefore, in the first embodiment of the present invention, when mismatching of parity is detected, the following data recovery process is executed.

First, the disc array controller 44 assumes that erroneous data is stored in the memory 12-1 of the device adapter located at the extreme end position of the disc array apparatus, which device adapter is shown in FIG. 4 as 45-1. Under this assumption, the host data is restructured (recovered) by the recovery method of RAID 3 level, and the host data can be recovered when a defective disc drive is loaded in the disc array apparatus 16 of the present invention.

In this case, since it is assumed that the divided data $d_1$ stored in the memory 12-1 is erroneous data, the data $d_1$ can be recovered by calculating an exclusive OR of the remaining data $d_2, d_3, \ldots d_m$ (other than the divided data $d_1$) and the parity data P. Therefore, the host data can be restructured from the all divided data $d_1, d_2, d_3, \ldots d_m$, including the recovered data $d_1$.

Thereafter, whether the restructured host data is correct or not is determined by checking the restructured host CRC data with the CRC checking section 20. When matching is attained by the CRC check with the CRC checking section 20, the disc array controller 44 defines the restructured host data as the correct host data, providing the conclusion that erroneous data is stored in the memory 12-1 of the device adapter 45-1.

If matching cannot be attained by the host CRC check, it is concluded that erroneous data must be stored in the memories 12-2 to 12-n of the device adapters 45-2 to 45-n other than the device adapter 45-1. Therefore, the disc array controller 44 defines the memory 12-2 of the adjacent device adapter 45-2 as the memory of device adapter to be assumed to be storing erroneous data. The disc array controller 44 also assumes the memory 12-1 of the device adapter 45-1 to be storing the correct data and then restructures again, under this assumption, the host data, causing the CRC checking section 20 to execute the host CRC check as explained above.

The above-mentioned process is repeated for the data being stored in the memories of all device adapters until matching of the host CRC is attained. As explained above, when matching is attained with the CRC check by the CRC checking section 20, such host data is defined as correct host data. The disc array controller 44 transfers the restructured host data to the host adapter 33. Upon reception of such data, the host adapter 33 transfers the host data to the host computer 1.

Figure 6:
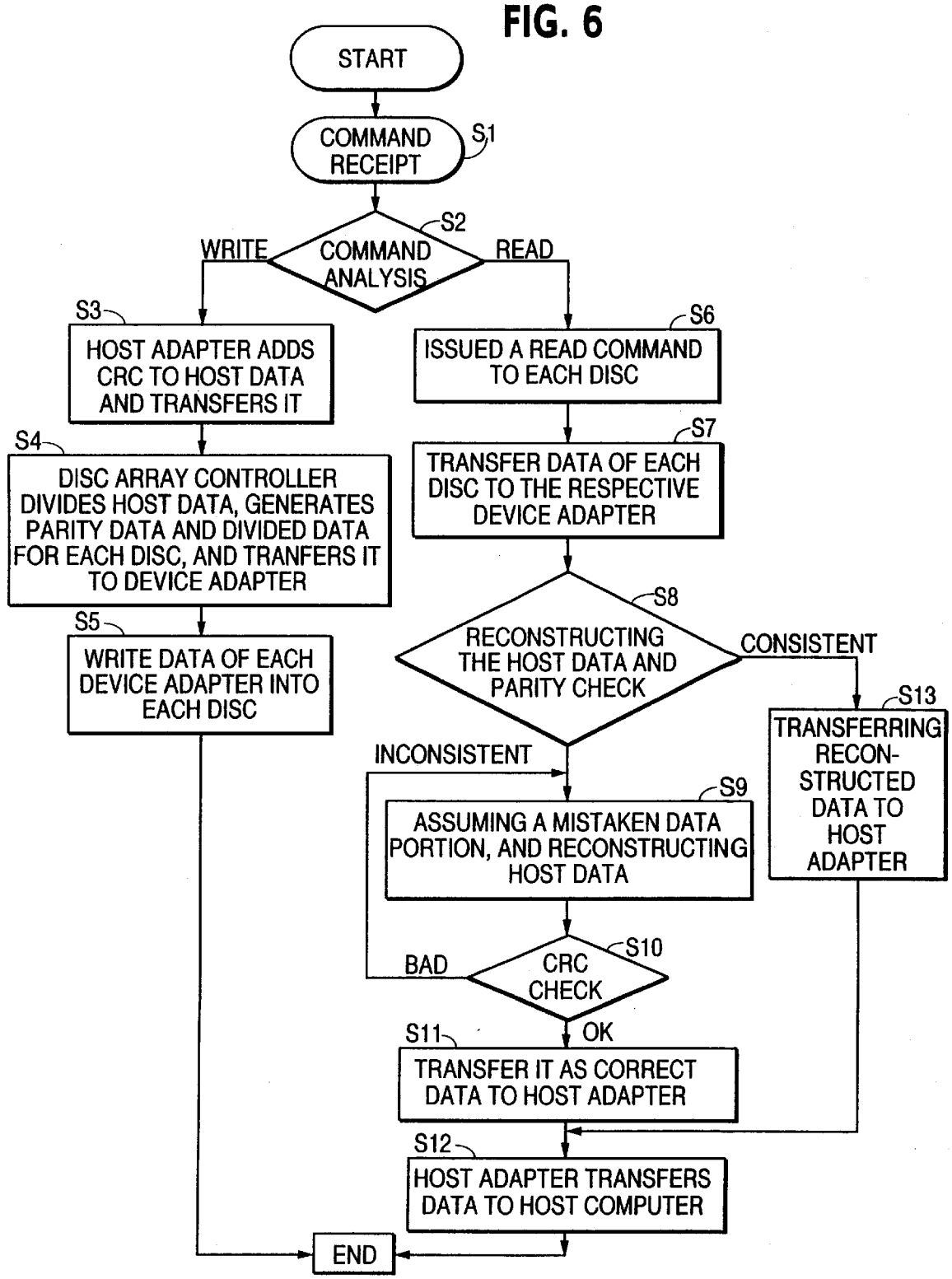
FIG. 6 is a flowchart of the first embodiment of the present invention.

FIG. 6 is a flowchart of the first embodiment of the present invention. The processes of the first embodiment of the present invention will be explained with reference to FIG. 6. S1 to S13 indicate the processing steps of the first embodiment of the present invention.

When the process is started and the host adapter 33 receives the command issued by the host computer 1 (S1), the host adapter 33 tentatively stores the command in the memory 10 and also judges the contents of the command by analyzing the command (S2). As a result, if the command is the write command, the process of the data write operation in the RAID-3 level is executed as explained below.

Upon reception of the host data requested to be written together with the write command from the host computer 1, the host adapter 33 tentatively stores the host data into the memory 10. The CRC processing section 11 generates the host CRC from the host data stored in the memory 10 and adds it to the host data to generate the host data having CRC. Thereafter, the host adapter 33 transfers the host data having CRC to the disc array controller 44 (S3).

The disc array controller 44 divides, upon reception of the host data having CRC, the host data having CRC into m pieces of data (also referred to as m data), consistent with RAID level 3, to generate the data to be assigned to the disc drives 46-1 to 46-m. Moreover, the parity processing section 19 generates the parity data by calculating exclusive OR of the m data.

Next, the disc array controller 44 issues a write instruction to the disc drives 46-1 to 46-n and transfers the data (divided data) for each disc drive to the device adapters 45-1 to 45-m. Simultaneously, the parity data generated is transferred to the device adapter 45-n (S4).

Thereafter, the device adapters 45-1 to 45-m send the write command and the divided data to the disc drives 46-1 to 46-m connected thereto. The disc drives 46-1 to 46-m write the divided data into a recording medium of the disc drives (which is referred to as writing of disc data). Moreover, the device adapter 45-n sends the write command and the parity data to the disc drive 46-n connected thereto, and the disc drive 46-n writes the parity data into the recording medium of the disc drive 45-n (S5), completing the write operation explained above.

Moreover, when the command received is detected as the read command in the process of step S2, the host adapter 33 transmits the contents of the read command to the disc array controller 44. The disc array controller 44 having received this information issues a read command to the disc drives 46-1 to 46-n with the address requested from the host computer 1 (S6).

The disc drives 46-1 to 46-n read, upon reception of the read command via the device adapters 45-1 to 45-n, the data having the address designated by the command. The disc drives 46-1 to 46-n transfer the data read to the device adapters 45-1 to 45-n connected to the disc drives 46-1 to 46-n. The device adapters 45-1 to 45-n store the data respectively in the memories 12-1 to 12-n (S7).

Thereafter, the disc array controller 44 restructures (recovers) the host data from the divided data stored in the memories 12-1 to 12-m of the device adapters 45-1 to 45-m. In this case, the parity processing section 19 of the disc array controller 44 calculates the exclusive OR of the data stored in the memories 12-1 to 12-m as the read parity data and compares this read parity data with the parity data stored in the memory 12-n to execute the read parity check (S8).

As a result, if both parity data are matched, the restructured (recovered) host data is transferred to the host adapter 33 under the judgment that the read parity check is normal and there is no contradiction in the matching (S13). Thereafter the host adapter 33 transfers the host data to the host computer 1 (S12). However, if matching cannot be attained in the read parity check of S8, it is assumed that contradiction is found in the matching of parity.

The disc array controller 44 executes, when it is detected that parities are mismatched as explained above, the following recovery process. First, the disc array controller 44 assumes that erroneous data is stored in the memory 12-1 of the device adapter 45-1 at the extreme end position. Under this assumption, the disc array controller 44 attempts restructuring of host data by the recovery method of RAID-3 level (S9).

The restructured host data is determined to be correct or not to be correct by checking the host CRC data with the CRC checking section 20 (S10). When matching is attained by the host CRC check executed by the CRC checking section 20, this host data is defined as the correct host data. The disc array controller 44 concludes that erroneous data is stored in the memory 12-1 of the device adapter 45-1.

If matching cannot be attained by the host CRC check, it is concluded that erroneous data must be stored in the memories 12-2 to 12-n of the device adapters 45-2 to 45-n other than the device adapter 45-1. Therefore, the disc array controller 44 defines the memory 12-2 of the adjacent device adapter 45-2 as the memory of the device adapter which is assumed to be storing the erroneous data and also assumes the memory 12-1 of the device adapter 45-1 to be storing the correct data. Under above assumption, the disc array controller 44 restructures again the host data and thereby the CRC checking section 20 executes the host CRC check to this restructured host data.

The foregoing process is repeated beginning with the process of the step S9 for all device adapters until matching can be attained with the host CRC. As explained above, when matching can be attained with the host CRC, the relevant host data is defined as the correct host data. Next, the disc array controller 44 transfers the restructured host data to the host adapter 33 (S11). The host adapter 33 receives this restructured host data and transfers in turn the data to the host computer 1 (S12).

2. The Second Embodiment of the Present Invention

Figure 7:
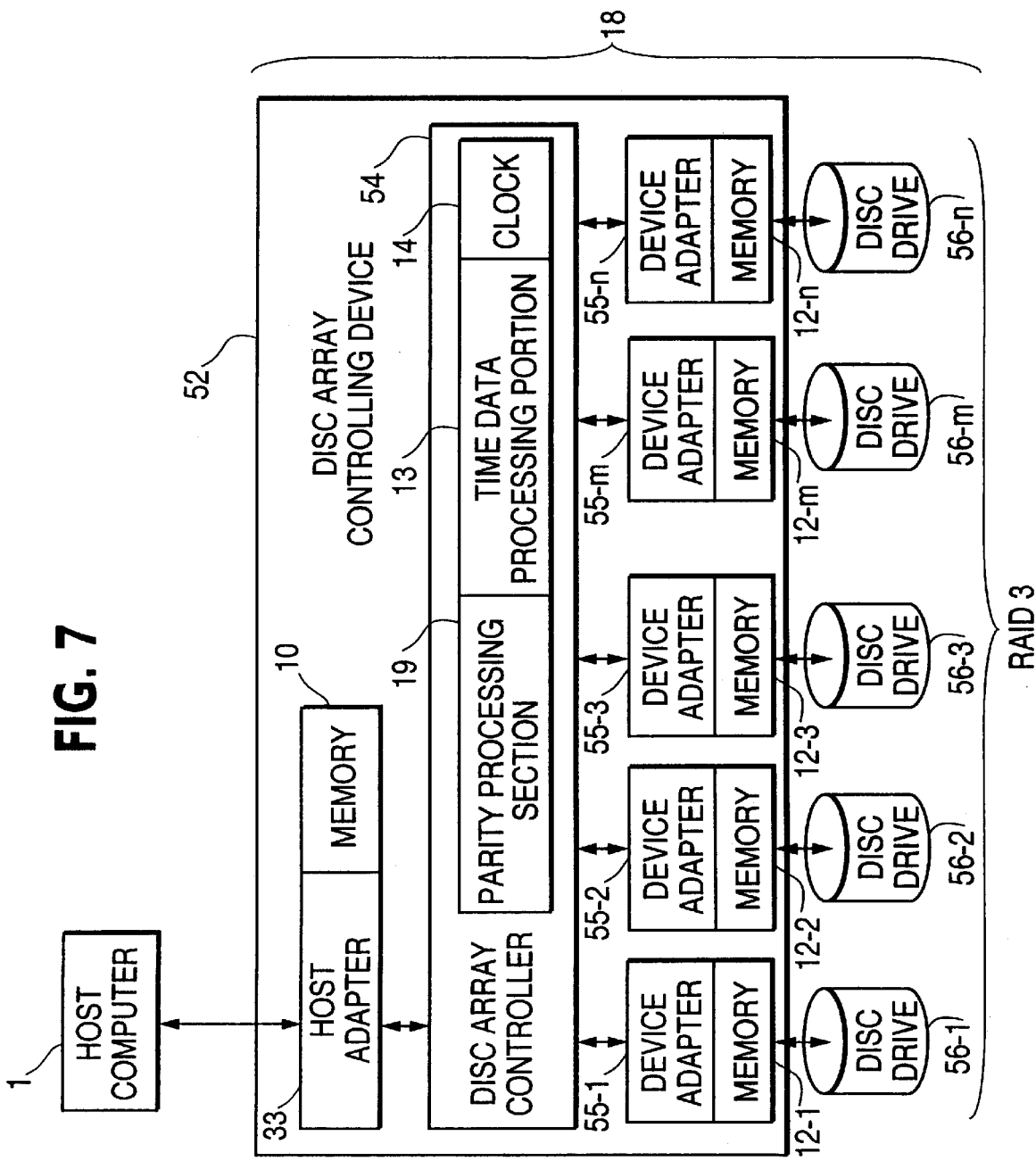
FIG. 7 is a structural diagram of the second embodiment of the present invention.

FIG. 7 is a structural diagram of the apparatus of the second embodiment of the present invention. The structure of the apparatus of the second embodiment will be explained with reference to FIG. 7. As shown in FIG. 7, the disc array apparatus 18 comprises a disc array controlling device 52 connected to the host computer 1 and a plurality of disc drives 56-1 to 56-n (where n is a number of units of the disc drives) connected to the disc array controlling device 52.

Moreover, the disc array controlling device 52 of the present invention comprises a host adapter 33, a disc array controller 54 and a plurality of device adapters 55-1 to 55-n. The host adapter 33 comprises a memory 10, the disc array controller 54 comprises a parity processing section 19, a time data processing portion 13 and a clock 14. As shown in FIG. 7, the device adapters 55-1 to 55-n are provided respectively with memories 12-1 to 12-n.

The parity processing section 19 executes generation and check of parity data. The clock 14 clocks the time and the clock data processing section 13 detects the time of the clock 14 to execute the process of the time data. Other structures not specifically described with reference to FIG. 7 are the same as the corresponding structures described with reference to the first embodiment of the present invention, shown in FIG. 4.

The second embodiment of the present invention is an example of the disc array apparatus of RAID-3 level. In this example, the disc array apparatus of RAID-3 level executes the following processes. During the data write operation, the host data received from the host computer 1 is divided into a plurality of data and parity data is computed from these divided data. The time data of the current time is added to the divided data and parity data.

Thereafter, the divided data (including time data) and parity data are transmitted to the disc drives 56-1 to 56-n and are then written into the recording media of the subject disc drives. In this case, the divided data having the time data are written into the disc drives 56-1 to 56-m and the parity data having the time data are written into the disc drive 56-n.

While the data is being read from one of the subject disc drives, if matching cannot be attained by the parity check of RAID 3 level, the time data written in the disc drives are compared. The data corresponding to the oldest time is defined as the erroneous data. The host data is restructured accordingly in the RAID-3 level.

During the data read operation from the subject disc drives, if matching cannot be attained in the parity check executed, reference is made to the time data written in the disc drives. If one of the subject disc drives stores the oldest time data, this disc drive is defined as the disc drive storing erroneous data and the correct host data is restructured by the recovery method of the RAID-3 level.

Figure 8:
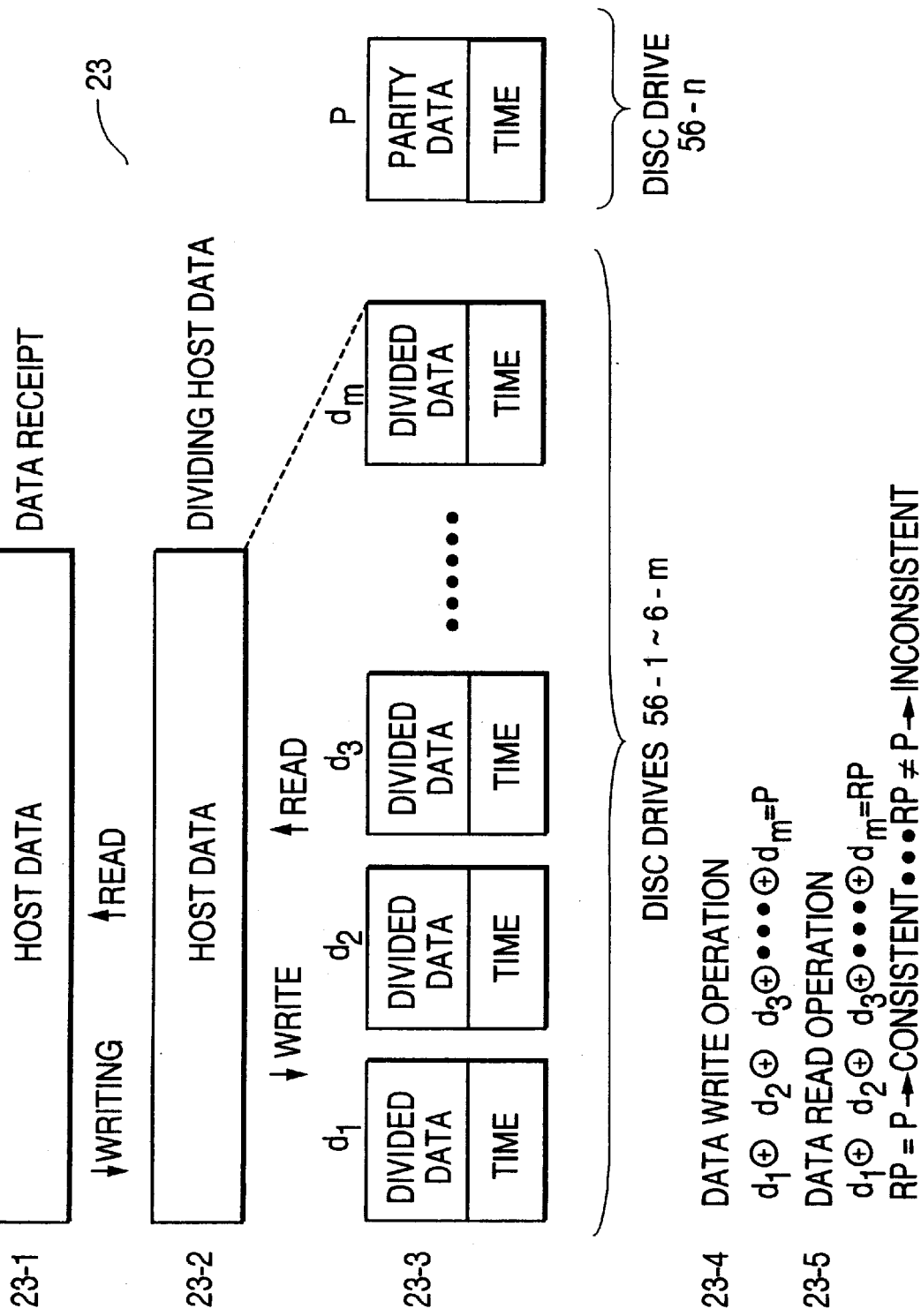
FIG. 8 is an explanatory diagram of processes in the second embodiment of the present invention.

FIG. 8 is an explanatory diagram of the processes in the second embodiment. The processes 23 of the second embodiment of the present invention will be explained with reference to FIG. 8.

(1) Write process in the RAID-3 level

The data write processes in the RAID-3 level are as follows. In this case, the disc drives 56-1 to 56-m are used to store the divided data (and are allocated as the disc drives storing data, consistent with RAID-3), while the disc drive 56-n is used to store parity data (and is allocated as the disc drive storing parity, also consistent with RAID-3) in view of executing the data read/write processes as explained below.

First, upon reception of the host data requested to be written together with the write command from the host computer 1, the host adapter 33 tentatively stores this host data into the memory 10 (refer to 23-1 in FIG. 8). Next, the host adapter 33 transfers the host data to the disc array controller 54 (refer to 23-2 in FIG. 8).

The disc array controller 54 having received the host data divides, based on the RAID-3 level, the host data into m pieces of data (also referred to as m data) to generate the data to be allocated to the disc drives 56-1 to 56-m (which data is referred to as divided data). Moreover, the parity processing section 19 generates the parity data by calculating an exclusive OR of the m divided data.

When the divided data obtained by dividing the host data is defined as $d_1, d_2, d_3, \ldots d_m$ and parity data as P, the parity data P becomes equal to the exclusive OR of the divided data $d_1, d_2, d_3, \ldots d_m$ (refer to 23-4 in FIG. 8). The time data processing section 13 read the current time from the clock 14 and adds such time data to the divided data and parity data.

Next, the disc array controller 54 issues a write command to the disc drives 56-1 to 56-n and transfers the divided data (including time data) to the device adapters 55-1 to 55-m. Simultaneously, the disc array controller 54 also transfers the parity data (including time data) to the device adapter 55-n.

Thereafter, the device adapters 55-1 to 55-m send a write command and the divided data (including time data) to the disc drives 56-1 to 56-m connected thereto. The disc drives 56-1 to 56-m write the divided data (including time data) into the recording media (which is referred to as writing of disc data). Moreover, the device adapter 55-n sends the write command to the disc drive 56-n connected thereto and also transfers thereto the parity data (including time data). Accordingly, the disc drive 56-n writes the parity data having the time data into a recording medium of the disc drive (refer to 23-3 in FIG. 8).

The processes which are executed in the second embodiment of the present invention when there is no contradiction in the matching of parity during the read operation in the RAID-3 level are as follows. First, when the host adapter 33 receives the read command issued by the host computer 1, the host adapter 33 transmits the content of the command to the disc array controller 54. The disc array controller 54 having received the content of the command issues a read command to the disc drives 56-1 to 56-n with the address requested from the host computer 1.

The disc drives 56-1 to 56-n having received the read command via the device adapters 55-1 to 55-n read the data of designated address. The data read by the disc drives 56-1 to 56-n are transferred to the device adapters 55-1 to 55-n connected to the disc drives 56-1 to 56-n and are stored respectively in the memories 12-1 to 12-n.

Thereafter, the disc array controller 54 restructures (recovers) the host data, based on the RAID-3 level, from the divided data stored in the memories 12-1 to 12-m of the device adapters 55-1 to 55-m. In this case, the parity processing section 19 obtains the read parity by calculating exclusive OR of the divided data stored in the memories 12-1 to 12-m and then compares such read parity with the parity stored in the memory 12-n to execute the read parity check.

In this case, when the divided data stored in the memories 12-1 to 12-m are defined as $d_1, d_2, d_3, \ldots d_m$, parity data stored in the memory 12-n as P, and the read parity computed from the divided data $d_1, d_2, d_3, \ldots d_m$, as RP, the read parity data RP becomes equal to exclusive OR of the divided data $d_1, d_2, d_3, \ldots d_m$.

When the result RP=P is obtained by the read parity check, there is no contradiction in the matching (refer to 23-5 in FIG. 8). When both parities are matched (RP=P) in the read parity check, the restructured data is transferred to the host adapter 33 under the assumption that the read parity check is completed normally and there is no contradiction in the matching of read data. Thereafter, the host adapter 33 transfers the data to the host computer 1.

As explained previously, when matching cannot be attained (RP≠P) between the read parity data RP obtained by computing the exclusive OR of the divided data stored in the memories 12-1 to 12-m of the device adapters 55-1 to 55-m and the parity data P stored in the memory 12-n of the device adapter 55-n, the following processes are executed under the assumption that there is contradiction in the matching.

When there is contradiction in the matching, the time data processing section 13 searches the time data of the data stored in the memories 12-1 to 12-m of the device adapters 55-1 to 55-m, and the disc array controller 54 determines the data having the oldest time to be erroneous data. The disc array controller 54 restructures the host data, based on the data recovery method of the RAID-3 level, from the data stored in the memories of the device adapters other than the erroneous data having the oldest time. The restructured host data is transferred to the host adapter 33 as the correct data. The host adapter 33 receives this data and transfers it to the host computer 1.

Figure 9:
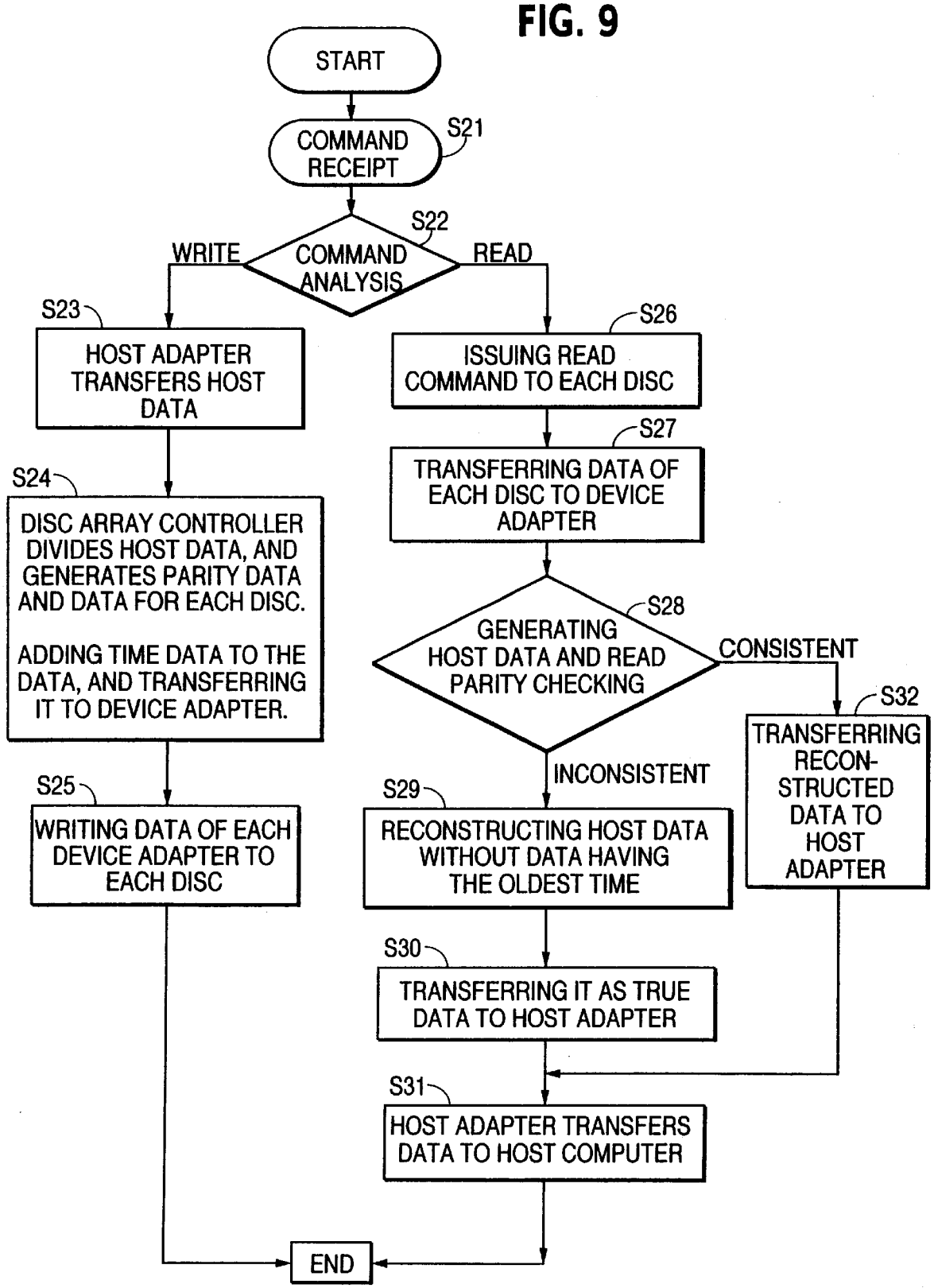
FIG. 9 is a flowchart of the second embodiment of the present invention.

FIG. 9 is a process flowchart of the second embodiment of the present invention. The processes in the second embodiment will be explained with reference to FIG. 9. S21 to S32 indicate the processing steps of the second embodiment of the present invention.

When the process is started and the host adapter 33 receives the command issued from the host computer 1 (S21), the host adapter 33 tentatively stores the command in he memory 10 and analyzes the command to determine whether the command is a write command or a read command (S22). When a write command is detected, the data write process in the RAID-3 level will be executed as follows.

As explained, the host adapter 33 tentatively stores, upon reception of the host data requested to be written together with the write command from the host computer 1, the received host data into the memory 10 and transfers the host data to the disc array controller 54 (S23).

Upon reception of the host data, the disc array controller 54 divides the host data into m pieces of data (m data), consistent with RAID-3 level, to generate divided data to be assigned to the disc drives 56-1 to 56-m. Moreover, the parity processing section 19 generates parity data by computing an exclusive OR of the m divided data. The time data processing section 13 reads the current time from the clock 14 and adds the time data to the divided data and parity data (S24).

Next, the disc array controller 54 issues the write command to the disc drives 56-1 to 56-m and transfers the divided data having the time data to the device adapters 55-1 to 55-m. Simultaneously, the parity data (including time data) is transferred to the device adapter 55-n.

Thereafter, the device adapters 55-1 to 55-m send the write command to the disc drives 56-1 to 56-m connected thereto and also transfer the divided data having the time data to the disc drives 56-1 to 56-m. The disc drives 56-1 to 56-m write the divided data having the time data to the memory media (which is referred to as the writing of data). Moreover, the device adapter 55-n sends the write command to the disc drive 56-n connected thereto, also transfers the parity data (including time data) to the disc drive 56-n, and writes the parity data (including time data) to the memory medium of the disc drive (S25) to complete the write process.

When the command received is determined in step S22 to be a read command, the host adapter 33 sends the content of the read command to the disc array controller 54. The disc array controller 54 receives this information and issues the read command to the disc drives 56-1 to 56-n with the address requested from the host computer 1 (S26).

The disc drives 56-1 to 56-n having received the read command via the device adapters 55-1 to 55-n read the data stored in the designated address. The data, including the time data, read from the disc drives 56-1 to 56-n are transferred to the device adapters 55-1 to 55-n connected to the disc drives 56-1 to 56-n and are then stored in the memories 12-1 to 12-n (S27).

Thereafter, the disc array controller 54 restructures the host data using the divided data stored in the memories 12-1 to 12-m of the device adapters 55-1 to 55-m. In this case, the parity processing section 19 generates the read parity by computing exclusive OR of the divided data stored in the device adapters 55-1 to 55-m, and compares this read parity with the parity data stored in the memory 12-n of the device adapter 55-n to execute the read parity check (S28).

When both parity data are matched, the restructured (recovered) host data is transferred to the host adapter 33 (S32) under the assumption that the read parity check has been completed normally and there is no contradiction in the matching. Thereafter, the host adapter 33 transfers the host data to the host computer 1 (S31).

If matching cannot be attained by the read parity check in step S28, it is assumed that there is contradiction in the matching. When mismatching is found in the parity, the following data recovery process is executed. In this case, the disc array controller 54 searches the time data stored in the memories 12-1 to 12-n of the device adapters 55-1 to 55-n and assumes that the data having the oldest time is erroneous data. Moreover, the disc array controller 54 restructures the host data (S29), based on the data recovery process of the RAID 3 level, from the data stored in the memories of the device adapters other than the erroneous data (the data having the oldest time). The restructured host data is transferred to the host adapter 33 as the correct (true) host data (S30). Upon reception of this correct host data, the host adapter 33 transfers this data to the host computer 1 (S31).

3. The Third Embodiment of the Present Invention

Figure 10:
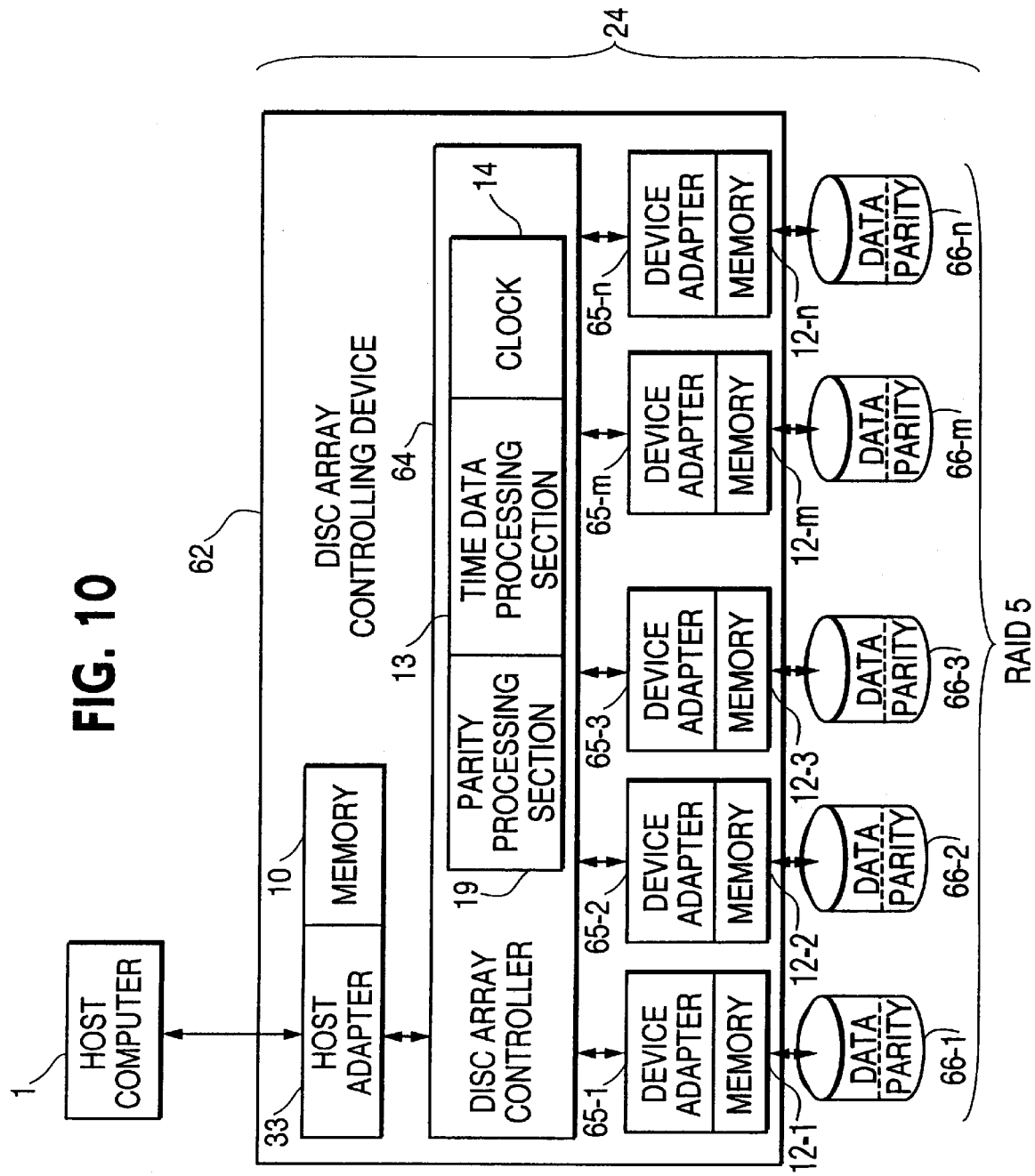
FIG. 10 is an explanatory diagram of the third embodiment of the present invention.

FIG. 10 is a structural diagram of the apparatus of the third embodiment of the present invention. The apparatus of the third embodiment will be explained with reference to FIG. 10.

As shown in FIG. 10, the disc array apparatus 24 of the present invention comprises a disc array controlling device 62 connected to the host computer 1 and a plurality of disc drives 66-1 to 66-n (where n is the number of units of disc drives) connected to the disc array controlling device 62.

The disc array controlling device 62 comprises a host adapter 33, a disc array controller 64 and a plurality of device adapters 65-1 to 65-n. The host adapter 33 comprises a memory 10, the disc array controller 64 comprises a parity processing section 19, a time data processing section 13 and a clock 14. The device adapters 65-1 to 65-n are respectively provided with memories 12-1 to 12-n.

In the third embodiment of the present invention, parity data are cyclically distributed to, and stored in, the disc drives 66-1 to 66-n, to execute the process described below in RAID-5 level. That is, the data is not stored in a particular, disc drive as in RAID-3 level, for example, but is cyclically distributed to each disc drive for storing, consistent with RAID-5. Other structures not specifically described with reference to FIG. 10 are the same as those of corresponding structures described previously in the second embodiment of the present invention.

The third embodiment of the present invention is an example of the disc array apparatus of the RAID-5 level and executes the following operations. In transferring a large amount of data by a data read process in the disc array apparatus 24 of the RAID-5 level, a parity check of data is possible by accessing all disc drives, as in the case of RAID-3 level and described above.

Therefore, the host data is restructured by the data recovery method of the RAID-5 level, in which the data (including time data) is stored in each disc drive by the process which is the same as that described with reference to the second embodiment of the present invention, but with parity data cyclically distributed among the disc drives 66-1 to 66-n (consistent with RAID 5). As described above, time data stored in each disc drive are compared in the read operation and the data having the oldest time is defined as erroneous disc data.

In the case of transferring a large amount of data during the read operation in RAID-5 level, a parity check is executed by accessing all disc drives, as in the case of the RAID-3 level. Accordingly, the host data can be restructured with the same processes as that described with reference to the second embodiment of the present invention.

The processes of the third embodiment of the present invention will be explained with reference to FIG. 10. The processes explained below indicate an example of the access to all disc drives.

(1) Write process in the RAID-5 level

The data write process in the RAID-5 level is executed as follows. In RAID-5, the disc drives 66-1 to 66-n are all used for storing divided data and parity data and the data read/write process is performed as follows.

First, the host adapter 33 receives the host data requested to be written together with the write command from the host computer 1 and tentatively stores the host data into the memory 10. Next, the host adapter 33 transfers the host data to the disc array controller 64.

Upon receiving the host data, the disc array controller 64 divides, based on the RAID 5 level, the host data into m (m=n−1) data in units of sectors to generate the divided data to be stored in all disc drives other than disc drive which will store parity data for the above-mentioned host data. Moreover, the parity processing section 19 generates the parity data by computing exclusive OR of the m divided data. The time data processing section 13 reads the current time from the clock 14 and adds the time data to the divided data and parity data.

Next, the disc array controller 64 issues a write command to the disc drives 66-1 to 66-n, and transfers the divided data having the time data to the relevant m device adapters of the device adapters 65-1 to 65-n. Simultaneously, the disc controller 64 also transfers the parity data (including time data) to the remaining one device adapter.

Thereafter, the device adapters storing the divided data (including time data) send the write command and also transfer the divided data (including time data) to the disc drives connected thereto. The disc drives having received the divided data (including time data) write such divided data (including time data) into the storing media of the disc drives. Meanwhile the device adapter storing the parity data having time sends the parity data having time and also transfers the parity data (including time data) to the disc drive connected to write the parity data (including time data) to the storing medium of the disc drive thereof.

(2) Explanation of the process of the third embodiment of the present invention when there is no contradiction in the matching of parity in the read process of RAID-5 level.

The processes of the third embodiment of the present invention when there is no contradiction in matching of parity during the read operation in the RAID-5 level are as follows.

When the host adapter 33 receives the read command issued from the host computer 1, the host adapter 33 transmits the content of the command to the disc array controller 64. The disc array controller 64 having received the content of the read command issues the read command to the disc drives 66-1 to 66-n with the address requested from the host computer 1.

The disc drives 66-1 to 66-n, having received the read command via the device adapters 65-1 to 65-n, read the data of the designated address. The data read from the disc drives 66-1 to 66-n are transferred to the device adapters 65-1 to 65-n connected to the disc drives 66-1 to 66-n and respectively stored in the memories 12-1 to 12-n.

Thereafter, the disc array controller 64 restructures (recovers) the host data, based on the RAID-5 level, from the divided data stored in the memories of device adapters. In this case, the parity processing section 19 generates the read parity by computing the exclusive OR of the divided data stored in the memories and compares this read parity with the parity data stored in any one of memories.

When both parity data are matched as a result of comparison, the restructured (recovered) data are transferred to the host adapter 33 under the assumption that the read parity check is completed normally and any contradiction cannot be found in the matching. Thereafter, the host adapter 33 transfers the data to the host computer 1.

(3) Explanation of the process of the third embodiment of the present invention when there is contradiction in the matching of parity in the read process of RAID-5 level When matching cannot be attained, as explained above, between the read parity data obtained by computing the exclusive OR of the divided data stored in the memories of the device adapters and the parity data stored in the memory of any one device adapter during the data read operation from the disc drives, the following processes are performed under the assumption that contradiction is found in the matching.

If contradiction is found in the matching, the time data processing section 13 searches the time data of the data stored in the memories 12-1 to 12-n of the device adapters 65-1 to 65-n and decides the data having the oldest time data is the erroneous data. The disc array controller 64 restructures the host data, based on the data recovery method of the RAID-5 level, from the data stored in the memories of the device adapters other than the erroneous data having the oldest time data. The restructured host data is transferred to the host adapter 33 as the correct data. The host adapter 33 receives the data and transfers the host data to the host computer 1.

Figure 11:
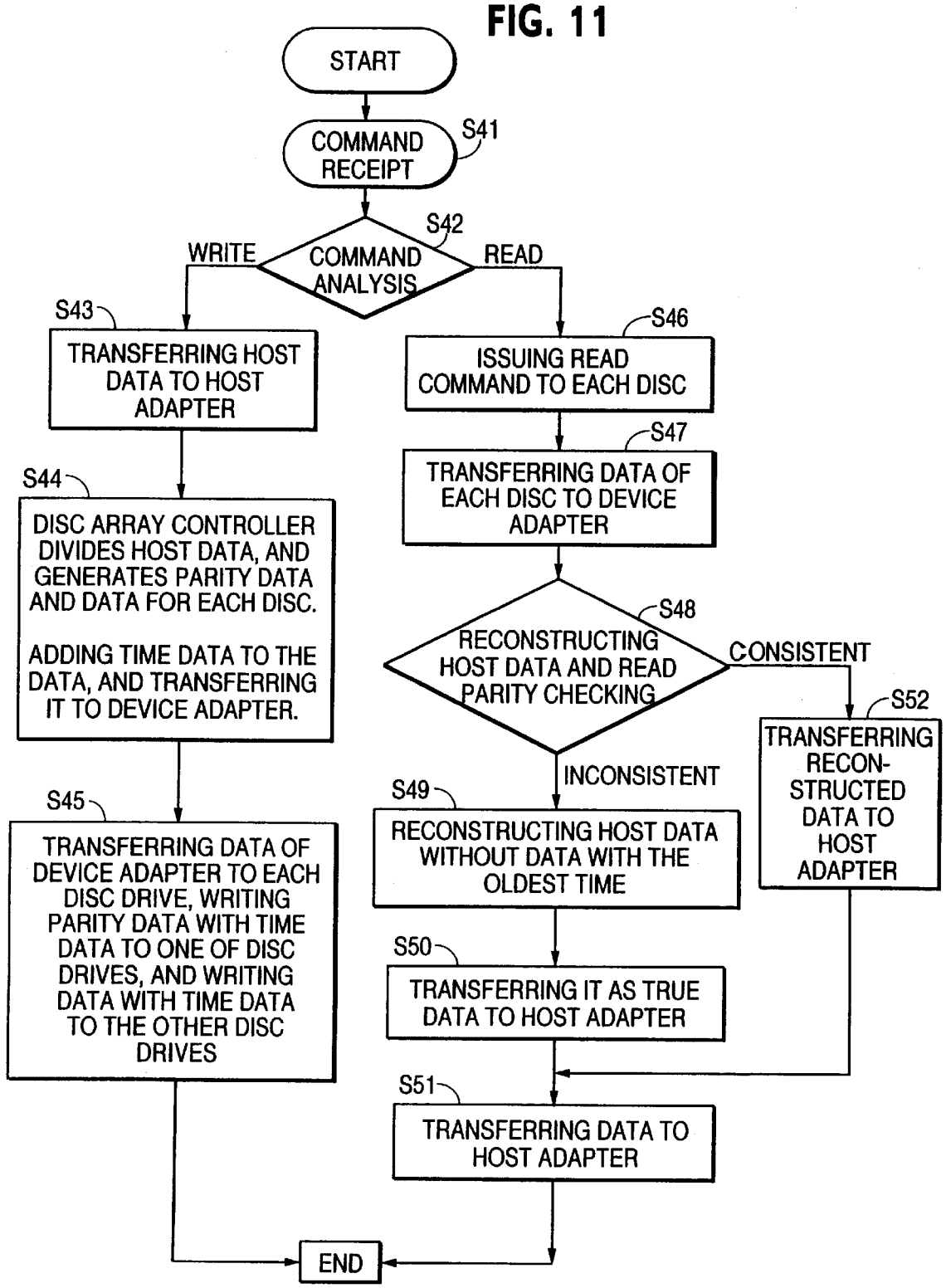
FIG. 11 is a flowchart of the third embodiment of the present invention.

FIG. 11 is a process flowchart of the third embodiment of the present invention. The processes in the third embodiment of the present invention will be explained with reference to FIG. 11. S41 to S52 indicate the processing steps of the third embodiment of the present invention.

When the process is started and the host adapter 33 receives a command generated from the host computer 1 (S41), the host adapter 33 tentatively stores the command into a memory 10 and analyzes the command to judge content of the command (S42). If the command is a write command, the data write process (writing of data) is executed as follows in RAID-5 level.

As explained above, the host adapter 33 having received the host data requested to be written together with the write command from the host computer 1 tentatively stores this host data into the memory 10 and then transfers the host data to the disc array controller 64 (S43).

The disc array controller 64 divides, upon reception of the host data, the data into m pieces of data (m data) in units of sectors based on RAID-5 level to generate the divided data to be allocated to the disc drives. Moreover, the parity processing section 19 generates parity data by computing the exclusive OR of the m divided data. The time data processing section 13 reads the current time from the clock 14 and adds the time data to the divided data and parity data.

The disc array controller 64 issues a write command to the disc drives 66-1 to 66-n and transfers the divided data (including time data) and one parity data (including time data) to the device adapters 65-1 to 65-n (S44).

Thereafter, the device adapters 65-1 to 65-n send the write command to the disc drives 66-1 to 66-n connected thereto, and also transfers the divided data (including time data) and parity data (including time data) thereto. The disc drives 66-1 to 66-n writes data (including time data) into the recording medium of the disc drives (S45). In this case, any one disc drive stores the parity data (including time data) and the other disc drives store the divided data (including time data). When the process explained above is completed, the write operation comes to the end.

Moreover, when the command received in processing step S42 is the read command, the host adapter 33 transmits the content of this read command to the disc array controller 64. The disc array controller 64 having received this information issues the read command to the disc drives 66-1 to 66-n with the address requested from the host computer 1 (S46).

The disc drives 66-1 to 66-n having received the read command via the device adapters 65-1 to 65-n read the data of designated address. The data (including time data) read from the disc drives 66-1 to 66-n are transferred to the device adapters 65-1 to 65-n connected to the disc drives 66-1 to 66-n and are then stored in the memories 12-1 to 12-n (S47).

Thereafter, the disc array controller 64 restructures (reconstructs) the host data using the divided data stored in the memories 12-1 to 12-n of the device adapters 65-1 to 65-n. Moreover, the parity processing section 19 generates, simultaneously with the restructuring of the data, the read parity by computing the exclusive OR of the m divided data, except for the parity data, among the data stored in the memories 12-1 to 12-n of the device adapters 65-1 to 65-n, and compares this read parity with the parity data (parity data generated during the read operation) stored in any one memory of the memories 12-1 to 12-n to execute the read parity check (S48).

When both parity data are matched as a result of read parity check, the restructured (recovered) host data is transferred to the host adapter 33 (S52) under the assumption that the read parity check is completed normally and any contradiction cannot be detected in the matching. Thereafter, the host adapter 33 transfers the host data to the host computer 1 (S51).

When matching cannot be attained in the read parity check of the step S48, contradiction is assumed to be found in the matching process. When the parities are mismatched, the following data recovery process is executed. In this case, the disc array controller 64 searches the time data of the data stored in the memories 12-1 to 12-n of the device adapters 65-1 to 65-n and defines the data having the oldest time as erroneous data.

Here, the host data is restructured (S49), based on the data recovery method of the RAID-5 level, from the data stored in the memories of the device adapters, except for the erroneous data having the oldest time data. The restructured host data is transferred to the host adapter as the correct (true) data (S50). The host adapter 33 receives this data and transfers the data to the host computer 1 (S51).

4. The Fourth Embodiment of the Present Invention

Figure 12:
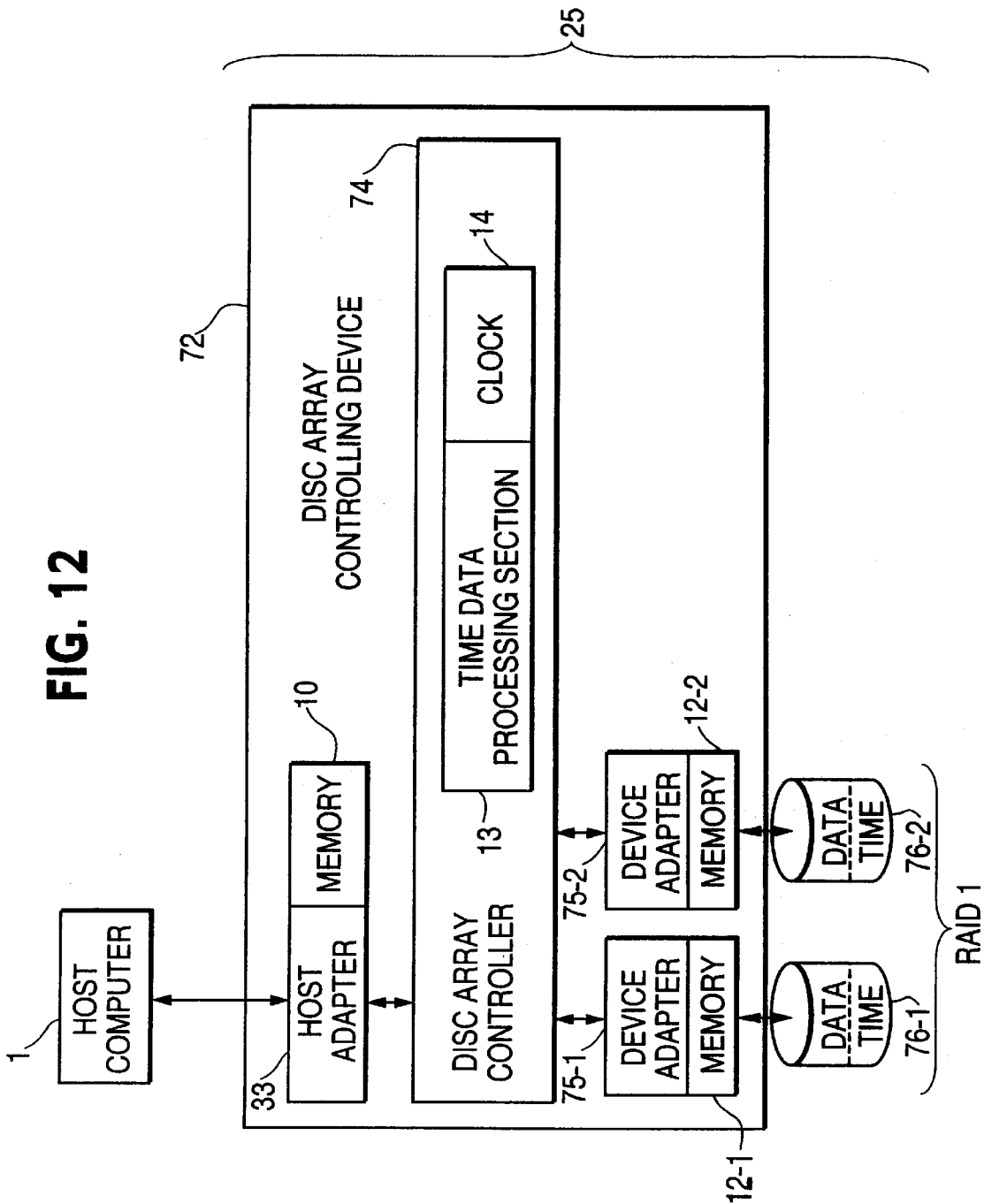
FIG. 12 is a structural diagram of the fourth embodiment of the present invention.

FIG. 12 is a structural diagram of the apparatus of the fourth embodiment of the present invention. The structure of the apparatus of the fourth embodiment will be explained with reference to FIG. 12. As shown in FIG. 12, the disc array apparatus 25 comprises a disc array controlling device 72 connected to the host computer 1 and at least one pair (two units) of disc drives 76-1 and 76-2 connected to the disc array controlling device 72. The two units of disc drives 76-1 and 76-2 shown in FIG. 12 are configured in a mirrored disc structure.

The disc array controlling device 72 comprises a host adapter 33, a disc array controller 74 and two units of device adapters (DA) 75-1 and 75-2. The host adapter 33 comprises a memory 10, the disc array controller 74 comprises a time data processing section 13 and a clock 14 and the device adapters (DA) 75-1 and 75-2 are respectively provided with memories 12-1 and 12-2.

The fourth embodiment of the present invention indicates an example of the disc array apparatus 25 of the RAID-1 level. In this example, the disc array apparatus 25 executes processes as explained below. When the disc array apparatus 25 detects mismatching of data through comparison of mirrored data stored in the disc drives 76-1 and 76-2, the disc array apparatus 25 compares the time data written in the disc drives 76-1 and 76-2 and uses the data having the latest time as the correct host data.

The processes of the fourth embodiment of the present invention will be explained below with reference to FIG. 12.

(1) Write operation in the RAID-1 level

The data read/write process in the RAID-1 level is executed as explained below. First, upon reception of the host data requested to be written together with the write command from the host computer 1, the host adapter 33 tentatively stores the host data into the memory 10. Next, the host adapter 33 transfers the host data to the disc array controller 74.

When the disc array controller 74 receives the host data, the time data processing section 13 reads the current time from the clock 14 and adds this time data to the host data. Next, the disc array controller 74 issues a write command to the disc drives 76-1 and 76-2 and also transfers the data (including time data) to the device adapters 75-1 and 75-2.

Thereafter, the device adapters 75-1 and 75-2 send the write command and the data (including the time data) to the disc drives 76-1 and 76-2. The disc drives 76-1 and 76-2 write the host data (including time data) into a memory medium of the disc drives. As explained, the same host data (including time data) is written into each of the disc drives 76-1 and 76-2, and is considered mirror data.

(2) Explanation of the process when matching is attained in the comparison of mirror data in the read process of the RAID-1 level.

The processes when matching is attained in the comparison of mirror data during the read operation in the RAID-1 level are as follows. First, when the host adapter 33 receives the read command issued from the host computer 1, the host adapter 33 transmits the content of the read command to the disc array controller 74. The disc array controller 74 having received the content of the read command issues the read command to the disc drives 76-1 and 76-2 with the address requested from the host computer 1.

The disc drives 76-1 and 76-2 having received the read command via the device adapters 75-1 and 75-2 reads the data of the designated address from the disc drives 76-1 and 76-2. The data read from the disc drives 76-1 and 76-2 is transferred to the device adapters 75-1 and 75-2 connected thereto, respectively, to the disc drives 76-1 and 76-2 and is then stored in the memories 12-1 and 12-2.

Thereafter, the disc array controller 74 compares the data stored in the memory 12-1 of device adapter 75-1 with the data stored in the memory 12-2 of device adapter 75-2 (which is referred to as comparison of mirror data). As a result, when matching is attained, any one set of data (for example, the data stored in the memory 12-1) is defined as the correct data and is then transferred to the host adapter 33. Thereafter, the host adapter 33 transfers the data to the host computer 1.

(3) Explanation of the process when matching cannot be attained in the comparison of mirror data in the read operation of the RAID-1 level.

As explained, when matching is not attained in the comparison of data respectively stored in the memories 12-1 and 12-2 of the device adapters 75-1 and 75-2 during the read operation from the disc drives, the time data processing section 13 searches the time data of the data stored in the memories 12-1 and 12-2 of the device adapters 75-1 and 75-2 and decides that the data having the oldest time is erroneous data.

The disc array controller 74 uses the data having the latest time as the correct host data. The data stored in the memory of the device adapter not storing the oldest data (i.e., the other device adapter) is transferred to the host adapter 33. The host adapter 33 receives this data and transfers this data to the host computer 1.

Figure 13:
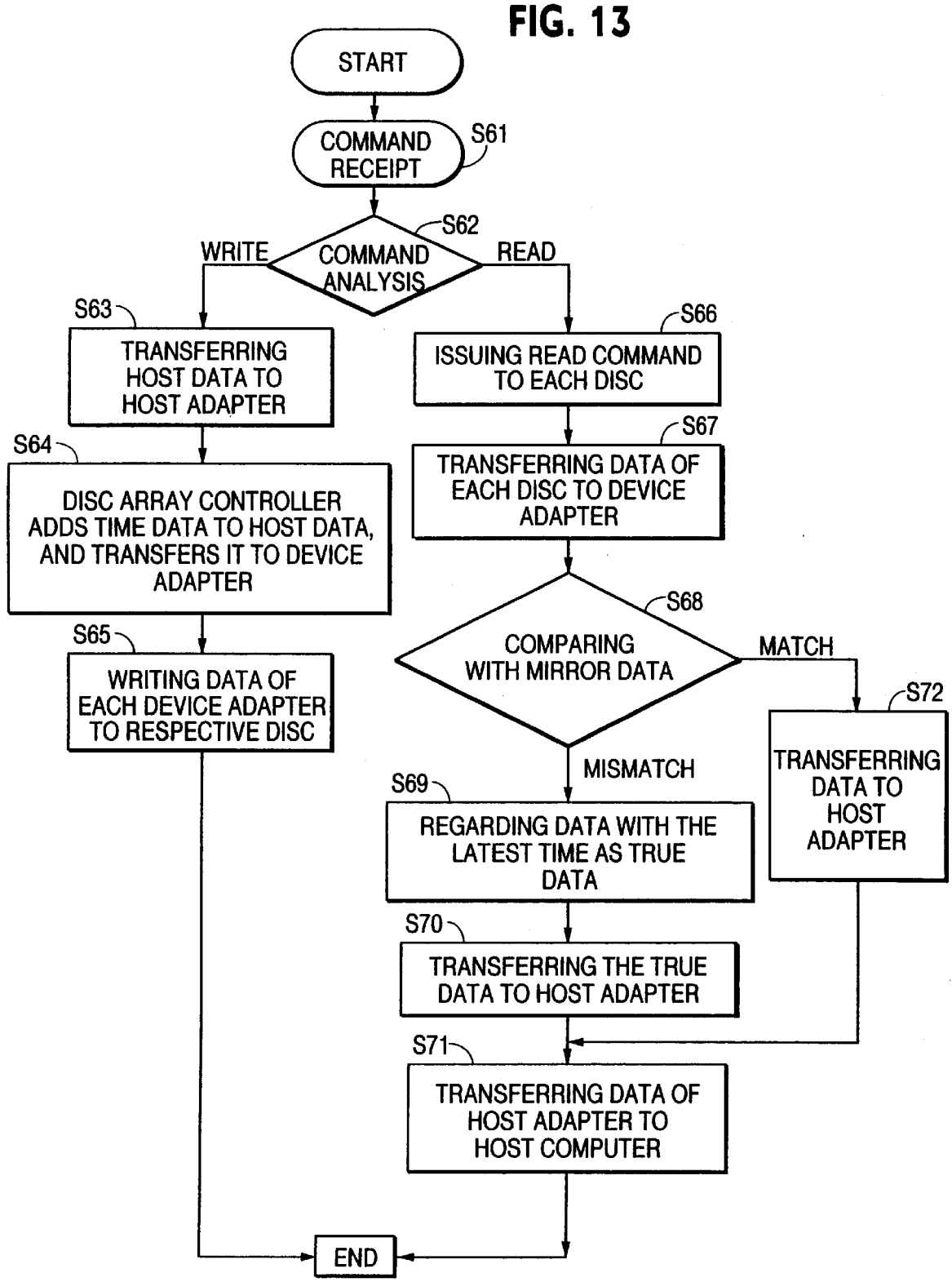
FIG. 13 is a flowchart of the fourth embodiment of the present invention.

FIG. 13 is a process flowchart of the fourth embodiment of the present invention. The processes in the fourth embodiment of the present invention will be explained with reference to FIG. 13. S61 to S72 indicate the processing steps executed in the fourth embodiment of the present invention.

When process is started and the host adapter 33 receives a command generated by the host computer 1, the host adapter 33 tentatively stores this command in the memory 10 and analyzes the command to determine the content of the command (S62). As a result, if a write command is detected in S62, the data write process is performed as follows in the RAID 1 level.

As explained above, upon reception of the host data requested to be written together with the write command from the host computer 1, the host adapter 33 tentatively stores the host data in the memory 10 and thereafter transfers the host data to the disc array controller 74 (S63).

The disc array controller 74 receives the host data and then executes the process based on the RAID-1 level. In this case, the time data processing section 13 reads the current time from the clock 14 and adds this time data to the host data. Next, the disc array controller 74 issues a write command to disc drives 76-1 and 76-2 and also transfers the data (including time data) to the device adapters 75-1 and 75-2 (S64).

Thereafter, the device adapters 75-1 and 75-2 send the write command and the data (including time data) to the disc drives 76-1 and 76-2 connected thereto. The disc drives 76-1 and 76-2 write the data (including time data) to the memory medium of the disc drives (S65) to complete the write operation.

When the command received in the process of step S62 is a read command, the host adapter 33 transmits the contents of the read command to the disc array controller 74. The disc array controller 74 having received the contents of the read command issues the read command to the disc drives 76-1 and 76-2 with the address requested from the host computer 1 (S66).

The disc drives 76-1 and 76-2 having received the read command via the device adapters 75-1 and 75-2 read the data of address designated. The data (including time data) read from the disc drives 76-1 and 76-2 is transferred to the device adapters 75-1 and 75-2 connected to the disc drives 76-1 and 76-2 and are then respectively stored in the memories 12-1 and 12-2 (S67).

Thereafter, the disc array controller 74 compares the mirror data by comparing the data stored in the memory 12-1 of device adapter 75-1 with the data stored in the memory 12-2 of the device adapter 75-2 (S68). When matching is attained, data of either memory 12-1 or 12-2 (either one can be selected as desired because memory 12-1 is storing the same data as memory 12-2) is transferred to the host adapter 33 as the correct host data (S72). Thereafter, the host adapter 33 transfers the host data to the host computer 1 (S71).

However, if matching cannot be attained in the process S68, which means that the mirror data are not matched, the data recovery process explained below is executed at this time. Accordingly, the disc array controller 74 searches the time data of the data stored in the memories 12-1 and 12-2 of the respective device adapters 75-1 and 75-2 and defines the data having the oldest time as erroneous data and the data having the latest time as correct data (S69).

The correct data (host data) is transferred to the host adapter 33 (S70). Thereafter, the host adapter 33 receives the data and transfers the data to the host computer 1 (S71).

5. The Fifth Embodiment of the Present Invention

Figure 14:
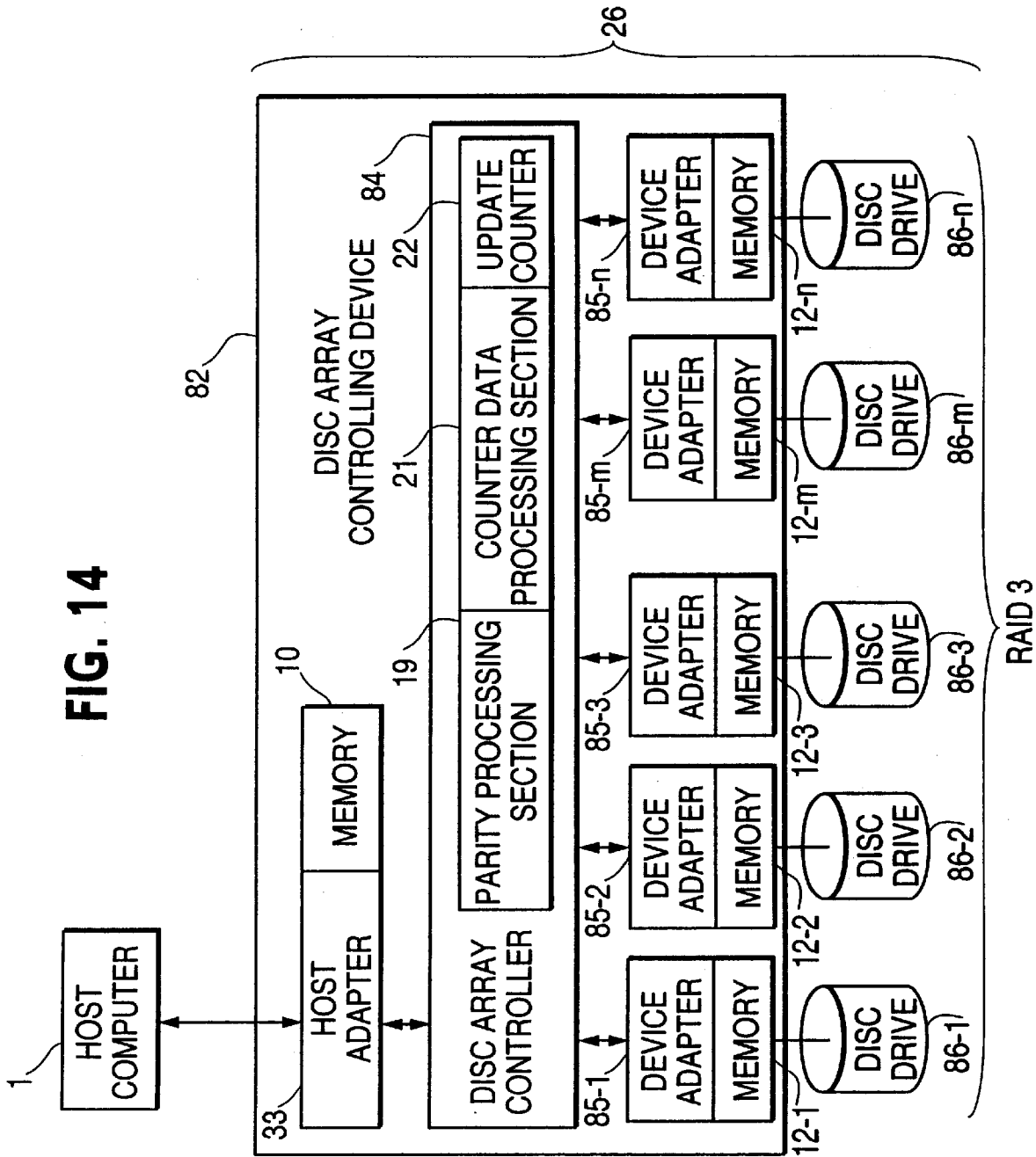
FIG. 14 is a structural diagram of the fifth embodiment of the present invention.

FIG. 14 is a structural diagram of the apparatus of the fifth embodiment of the present invention. The structure of the disc array apparatus 26 of the fifth embodiment of the present invention will be explained with reference to FIG. 14. As shown in FIG. 14, the disc array apparatus 26 comprises a disc array controlling device 82 connected to the host computer 1 and a plurality of disc drives 86-1 to 86-n (where n is the number of units of disc drives) connected to the disc array controlling device 82.

Moreover, the disc array controlling device 82 comprises a host adapter 33, a disc array controller 84 and a plurality of device adapters 85-1 to 85-n. The host adapter 33 comprises a memory 10, the disc array controller 8 comprises a parity processing section 19, an update counter 22 and a counter data processing section 21, and the device adapters 85-1 to 85-n are respectively provided with memories 12-1 to 12-n.

The update counter 22 is a counter of which the counter value is sequentially controlled to be updated by the disc array controller 84. For example, a counter which increments the counter value for each data write operation is used as the update counter 22. In addition, the counter data processing section 21 reads the counter value of the update counter 22 and adds the counter value to the write data, or checks the counter value of the update counter 22 added to the data read. Other structures not specifically discussed are the same as those of the second embodiment of the present invention, described with respect to FIG. 7.

The fifth embodiment of the present invention is an example of an apparatus in which a counter value of the update counter 22 is used in place of the time data of the process in the second embodiment. In the example of FIG. 14, processes are executed as follow in the RAID-3 level.

(1) Write process in the RAID-3 level

The data write process in the RAID-3 level is executed as follows. In the case of a data write process, the disc drives 86-1 to 86-m are used for storing divided data, while the disc drive 86-n is used for storing parity data to execute the data read/write processes as explained below.

First, the host adapter 33 receives the host data requested to be written together with the write command from the host computer 1 and tentatively stores this host data in the memory 10. Next, the host adapter 3 transfers the host data to the disc array controller 84.

Upon reception of the host data, the disc array controller 84 divides the host data into m pieces of divided data (m divided data), consistent with the RAID-3 level, to generate the divided data to be assigned to the disc drives 86-1 to 86-m. Moreover, the parity processing section 19 generates parity data by computing an exclusive OR of the m divided data. The counter data processing section 21 reads the current counter value from the update counter 22 and adds this counter value to the divided data and parity data.

Next, the disc array controller 84 issues a write instruction to the disc drives 86-1 to 86-n and transfers the divided data (including the counter value) to the device adapters 85-1 to 85-m. Simultaneously, the disc array controller 84 transfers the parity data (including the counter value) to the device adapter 85-n.

Thereafter, the device adapters 85-1 to 85-m send the write command to the disc drives 86-1 to 86-m connected thereto and also transfers the divided data (including the counter value) thereto. The disc drives 86-1 to 86-m write the divided data (including the counter value) to the memory medium of the disc drives. Moreover, the device adapter 85-n sends a write command to the disc drive 6-n and also transfers the parity data (including the counter value) thereto. Accordingly, the disc drive 6-n writes the parity data (including the counter value) to the memory medium of the disc drive 6-n.

(2) Explanation of the process of the fifth embodiment of the present invention when contradiction is not found in the matching of parity in the read process of RAID-3 level.

The process when contradiction is not found in the matching of parity during a read operation of the RAID 3 level in the fifth embodiment of the present invention is as follows. First, when the host adapter 33 receives the read command issued from the host computer 1, the host adapter 33 transmits the contents of the read command to the disc array controller 84. The disc array controller 84 having received the contents of the read command issues the read command to the disc drives 86-1 to 86-n with the address requested from the host computer 1.

The disc drives 86-1 to 86-n having received the read command via the device adapters 85-1 to 85-n read the data of designated address. The data read from the disc drives 86-1 to 86-n are transferred to the device adapters 85-1 to 85-n respectively connected to the disc drives 86-1 to 86-n and are then respectively stored in the memories 12-1 to 12-n.

Thereafter, the disc array controller 84 restructures (recovers) the host data, based on the RAID-3 level, from the divided data stored in the memories 12-1 to 12-m of the device adapters 85-1 to 85-m. In this case, the parity processing section 19 obtains the read parity by computing the exclusive OR of the divided data stored in the memories 12-1 to 12-m and then compares this read parity with the parity data stored in the memory 12-n. When both parities are matched as a result of comparison, the restructured (recovered) host data is transferred to the host adapter 33 under the assumption that the read parity check is completed normally and contradiction is not found in the matching. Thereafter the host adapter 33 transfers the data to the host computer 1.

(3) Explanation of the process executed by the fifth embodiment of the present invention when contradiction is found in the matching of parity in the read operation of the RAID-3 level.

As explained above, when matching cannot be attained between the read parity data obtained by computing the exclusive OR of the data stored in the memories 12-1 to 12-m of the device adapters 85-1 to 85-m and the parity data stored in the memory 12-n of the device adapter 85-n, the following processes are executed by the fifth embodiment of the present invention, under the assumption that contradiction is found in the above-mentioned matching.

In this case, the counter data processing section 21 searches the counter value of data stored in the memories 12-1 to 12-n of the device adapters 85-1 to 85-n. The disc array controller 84 decides that the data having the oldest counter value is erroneous data.

The disc array controller 84 restructures the host data, based on the data recovery method of the RAID-3 level, from the data stored in the memories of the device adapters other than the device adapter corresponding to the data having the oldest counter value. The restructured host data is transferred to the host adapter 33 as the correct data. Upon reception of the host data, the host adapter 33 transfers this host data to the host computer 1.

Figure 15:
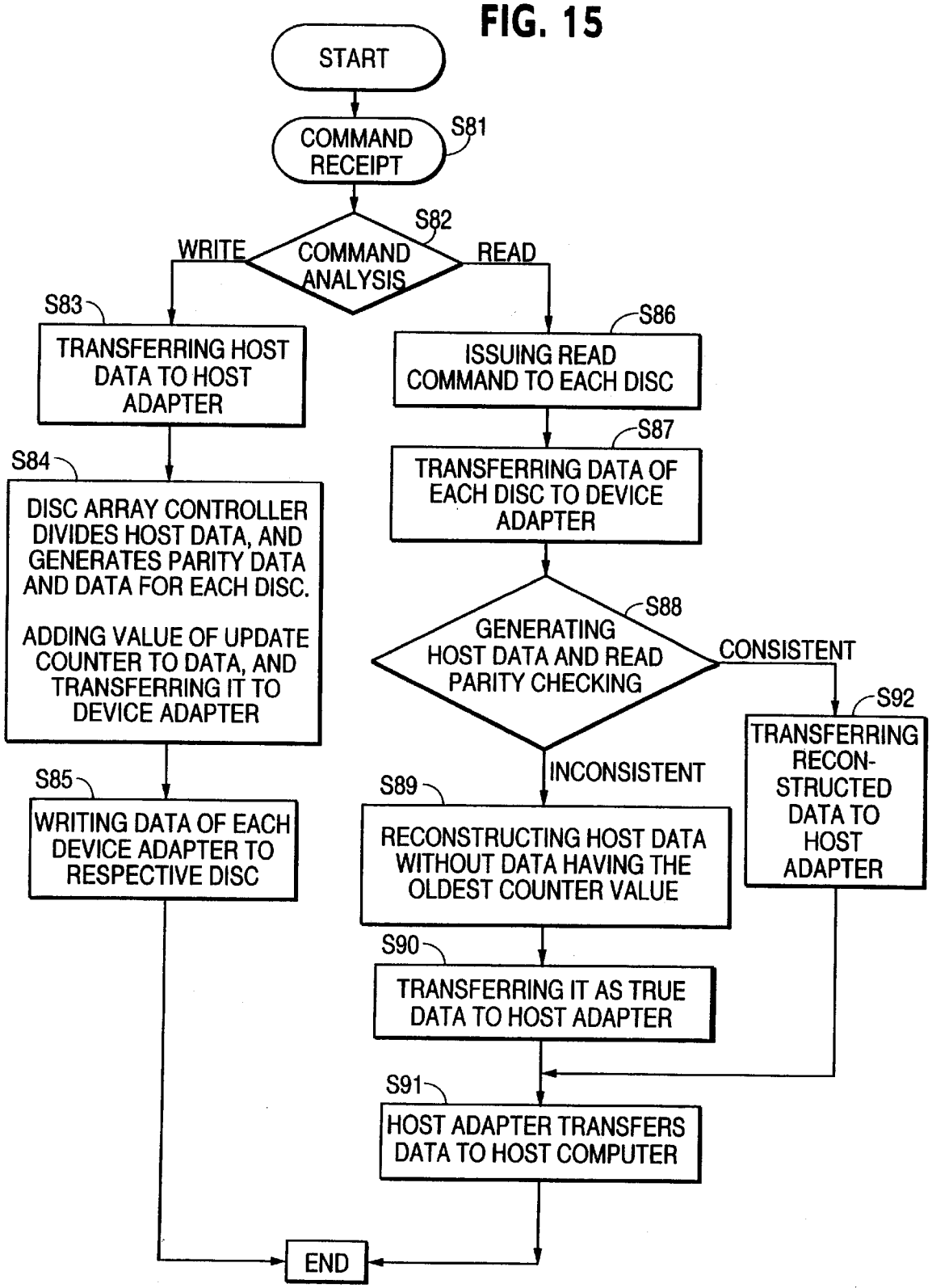
FIG. 15 is a flowchart of the fifth embodiment of the present invention.
Figure 16:
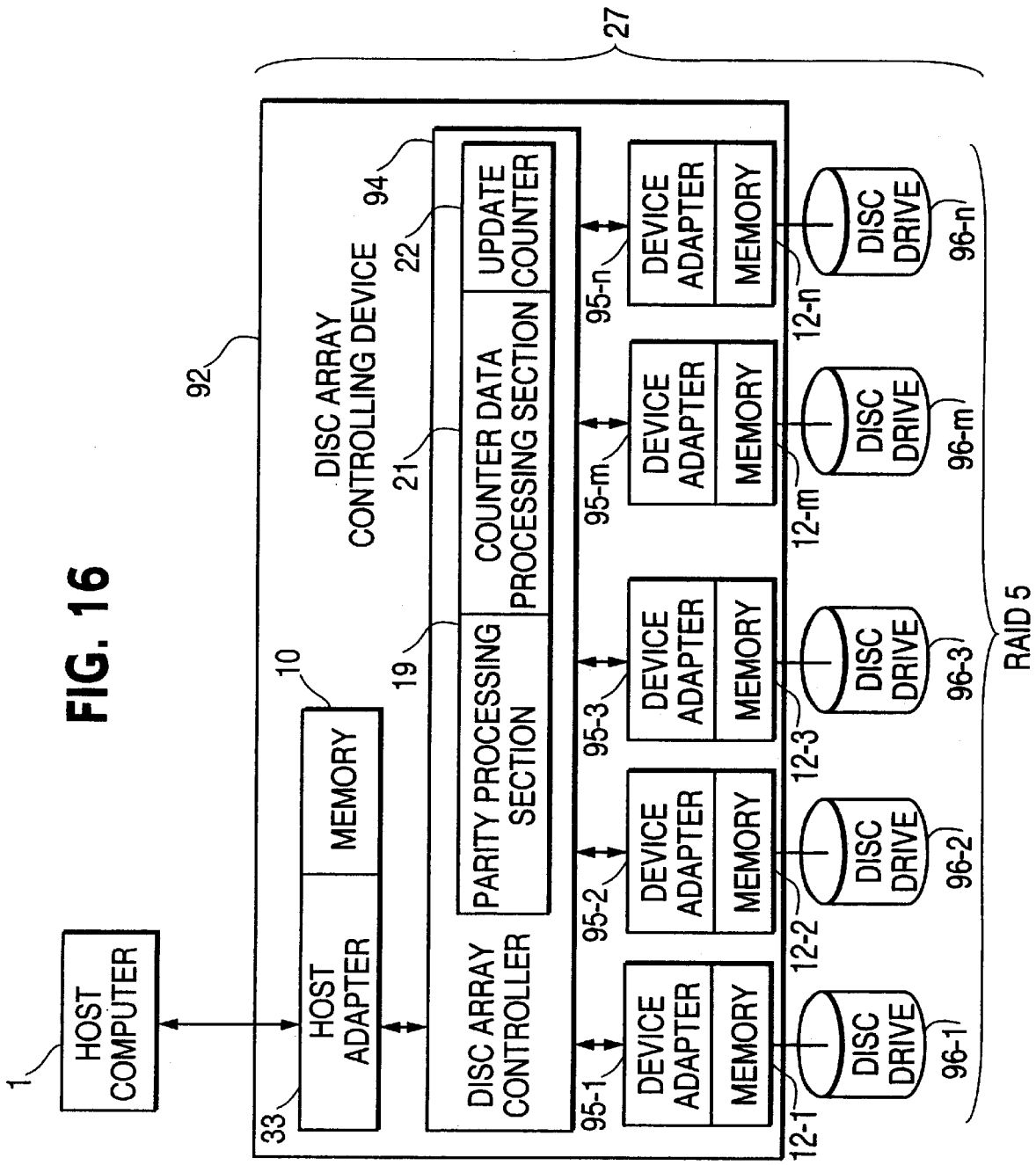
FIG. 16 is a structural diagram of the sixth embodiment of the present invention.

FIG. 15 is a process flowchart of the fifth embodiment of the present invention. The processes in the fifth embodiment of the present invention will be explained with reference to FIG. 15. S81 to S92 indicate the processing steps executed in the fifth embodiment of the present invention.

When the process is started and the host adapter 33 receives the command issued from the host computer 1 (S81), the host adapter 33 tentatively stores this command in the memory 10 and analyzes this command to determine content thereof (S82). If a write command is detected in S82, the data write process is executed as explained below in the RAID-3 level.

As explained above, when the host adapter 33 receives the host data requested to be written together with the write command from the host computer 1, the host adapter 33 tentatively stores the host data in memory 10. The host adapter 33 transfers the host data to the disc array controller 84 (S83).

Upon reception of host data, the disc array controller 84 divides the host data into m pieces of divided data (m divided data), consistent with the RAID-3 level, to generate the divided data to be allocated to the disc drives 86-1 to 86-m. Moreover, the parity processing section 19 generates parity data by computing an exclusive OR of the m divided data. The counter data processing section 21 reads the current counter value from the update counter 22 and adds the counter value to the divided data and parity data.

Next, the disc array controller 84 issues a write command to the disc drives 86-1 to 86-n and transfers the divided data having the counter value of each disc drive generated to the device adapters 85-1 to 85-m. Simultaneously, the parity data having the counter value is transferred to the device adapter 85-n (S84).

Thereafter, the device adapters 85-1 to 85-m send the write command and the divided data to the disc drives 86-1 to 86-m connected thereto. The disc drives 86-1 to 86-m write the divided data (including the counter value) into the memory medium of the disc drives. The device adapter 85-n sends the write command and the parity data (including the counter value) to the disc drive 86-n connected thereto. The disc drive 86-n writes the parity data (including the counter value) into the memory medium of the disc drive (S85) to complete the write process.

If the command received is detected as the read command in the step S82, the host adapter 33 transmits the contents of the read command to the disc array controller 84. The disc array controller 84 having received the contents of the read command issues a read command to the disc drives 86-1 to 86-n with the address requested from the host computer 1 (S86).

The disc drives 86-1 to 86-n having received the read command via the device adapters 85-1 to 85-n read the data of the designated address. The data (including the counter value) read from the disc drives 86-1 to 86-n is transferred to the device adapters 85-1 to 85-n connected to the disc drives 86-1 to 86-n and is then stored in the memories 12-1 to 12-n (S87).

Thereafter, the disc array controller 84 restructures the host data from the divided data stored in the memories 12-1 to 12-m of the device adapters 85-1 to 85-m. Moreover, the parity processing section 19 also generates read parity, simultaneously with restructuring of the host data, by computing an exclusive OR of the data stored in the device adapters 85-1 to 85-m and compares this read parity data with the parity stored in the memory 12-n of the device adapter 85-n to execute the read parity check (S88).

When both parity data are matched as a result of the comparison of parity, the restructured host data is transferred to the host adapter 33 under the assumption that the read parity check is completed normally and any contradiction is not found in the matching (S92). Thereafter, the host adapter 33 transfers the host data to the host computer 1 (S91).

However, if matching cannot be attained in the read parity check in the step S88, contradiction is assumed to be found in the matching. Accordingly, the following data recovery process is executed when mismatching of parity is detected. In this case, the disc array controller 84 searches the counter values of the data stored in the memories 12-1 to 12-n of the device adapters 85-1 to 85-n and decides the data having the oldest counter value is erroneous data.

Here, the host data is restructured, based on the data recovery process of the RAID-3 level, from the data stored in the memories of the device adapters other than the device adapter corresponding to the erroneous data having the oldest counter value (S89). The restructured host data is then transferred to the host adapter 33 as the correct (true) data (S90). The host adapter 33 having received the data transfers this data to the host computer 1 (S91).

6. The Sixth Embodiment of the Present Invention

The sixth embodiment of the present invention is an example of a disc array apparatus of the present invention using a counter value of the update counter in place of the time data used in the third embodiment of the present invention.

The disc array apparatus 27 of the sixth embodiment of the present invention implements the RAID-5 level as in the third embodiment of the present invention (which is shown in FIG. 10), but on an apparatus similar to the disc array apparatus 26 shown in FIG. 14 and implementing the fifth embodiment of the present invention. The sixth embodiment of the present invention is explained with reference to FIG. 16. The flowchart shown in FIG. 15, the explanation of which is not repeated herein, is applicable to the apparatus shown in FIG. 16, as well as to the apparatus shown in FIG. 14.

As in the third embodiment of the present invention, the disc array apparatus 27 of the seventh embodiment implements RAID-5 level. Accordingly, data and parity are distributed among disc drives 96-1 to 96-n shown in FIG. 16.

In the sixth embodiment of the present invention, the following processes are executed in the RAID-5 level. Also in the sixth embodiment, the following processes show an example when access is made to all disc drives.

(1) Write process in the RAID-5 level

The data write operation in the RAID-5 level is as follows. In the sixth embodiment of the present invention, the disc drives 96-1 to 96-n are all used for storing divided data and parity data to execute the data read/write operation as explained below.

First, the disc array controlling device 92 receives via the host adapter 33, the host data requested to be written by the disc array controlling device, along with the write command from the host computer 1. The device adapter 33 having received the host data requested to be written together with the write command from the host computer 1 tentatively stores this host data into the memory 10. Next, the host adapter 33 transfers the host data to the disc array controller 94.

Upon reception of the host data, the disc array controller 94 divides, based on the RAID-5 level, the host data into m pieces of data (m data) in units of sectors to generate the divided data to be allocated to the disc drives other than one disc drive for storing parity data. Moreover, the parity processing section 19 generates the parity data by computing the exclusive OR of the m divided data. The counter data processing section 21 reads the current counter value from the update counter 22 and adds this counter value to the divided data and parity data.

Next, the disc array controller 94 issues a write command to the disc drives 96-1 to 96-n and transfers the divided data (including the counter value) to the relevant m (m=n−1) device adapters storing data among the device adapters 95-1 to 95-n. Simultaneously, the parity data (including the counter value) is transferred to the remaining one device adapter. As in the case of the third embodiment of the present invention described above, and consistent with RAID level-5, one of the disc drives 96-1 to 96-n is not dedicated exclusively to storing parity data, and the parity data is interspersed with host data stored in each of the disc drives 96-1 to 96-n.

Thereafter, the device adapters storing the divided data (including the counter value) send the write command to the disc drives connected respectively thereto, and transfers the divided data (including the counter value) thereto. The disc drives having received the divided data (including the counter value) write this data in the memory medium of the disc drives. Moreover, the device adapter storing the parity data (including the counter value) sends the write command to the disc drive connected thereto, and also transfers the parity data (including the counter value) to the subject disc drive. This disc drive writes the parity data (including the counter value) to the memory medium of the disc drive.

(2) Explanation of processes when contradiction is not found in matching of parity during the read operation in the RAID-5 level in the sixth embodiment of the present invention.

The processes executed by the sixth embodiment of the present invention when contradiction is not found in the matching of parity during the read operation in the RAID 5 level are as follows. First, when the host adapter 33 receives the read command issued from the host computer 1, the host adapter 33 transmits the contents of the read command to the disc array controller 94. The disc array controller 94 having received the contents of the read command issues the read command to the disc drives 96-1 to 96-n with the address requested from the host computer 1.

The disc drives 96-1 to 96-n having received the read command via the device adapters 95-1 to 95-n read the data of the designated address. The data read from the disc drives 96-1 to 96-n is transferred to the device adapters 95-1 to 95-n connected to the disc drives 96-1 to 96-n and are then stored in the memories 12-1 to 12-n.

Thereafter, the disc array controller 94 restructures (recovers) the host data, based on the RAID-5 level, from the divided data stored in the memories of the device adapters. In this case, the parity processing section 19 obtains the read parity by the computing the exclusive OR of the divided data stored in the memories and compares this read parity with the parity data stored in the one memory storing parity.

When both parities are matched as a result of comparison, the restructured (recovered) data is transferred to the host adapter 33 under the assumption that the read parity check is completed normally and contradiction is not detected in the matching. Thereafter, the host adapter 33 transfers the data to the host computer 1.

(3) Explanation of processes in the sixth embodiment of the present invention when contradiction is found in the matching of parity during read operation in the RAID-5 level.

As explained above, when matching cannot be attained between the read parity data obtained by computing the exclusive OR of the divided data stored in the memories of the device adapters and the parity data stored in the memory of any one device adapter, the following processes are executed under the assumption that there is contradiction in the matching.

In this case, the counter data processing section 21 searches the counter values of data stored in the memories 12-1 to 12-n of the device adapters 95-1 to 95-n and decides the data having the oldest counter value as erroneous data. The disc array controller 94 further restructures the host data, based on the data recovery method in the RAID-5 level, from the data stored in the memories of the other device adapters, except for the erroneous data having the oldest counter value. The restructured host data is transferred to the host adapter 33 as the correct data. The host adapter 33 receives this data and then transfers the data to the host computer 1.

7. The Seventh Embodiment of the Present Invention

The seventh embodiment of the present invention is an example of a disc array apparatus of the present invention using a counter value of the update counter in place of the time data used in the fourth embodiment of the present invention. The disc array apparatus 28 of the seventh embodiment of the present invention implements the RAID-1 level as in the fourth embodiment of the present invention (which is shown in FIG. 12), but on an apparatus similar to the disc array apparatus 26 shown in FIG. 14. The seventh embodiment of the present invention is explained with reference to FIG. 17. The flowchart shown in FIG. 15, the explanation of which is not repeated herein, is applicable to the apparatus shown in FIG. 17, as well as to the apparatus shown in FIG. 14.

Figure 17:
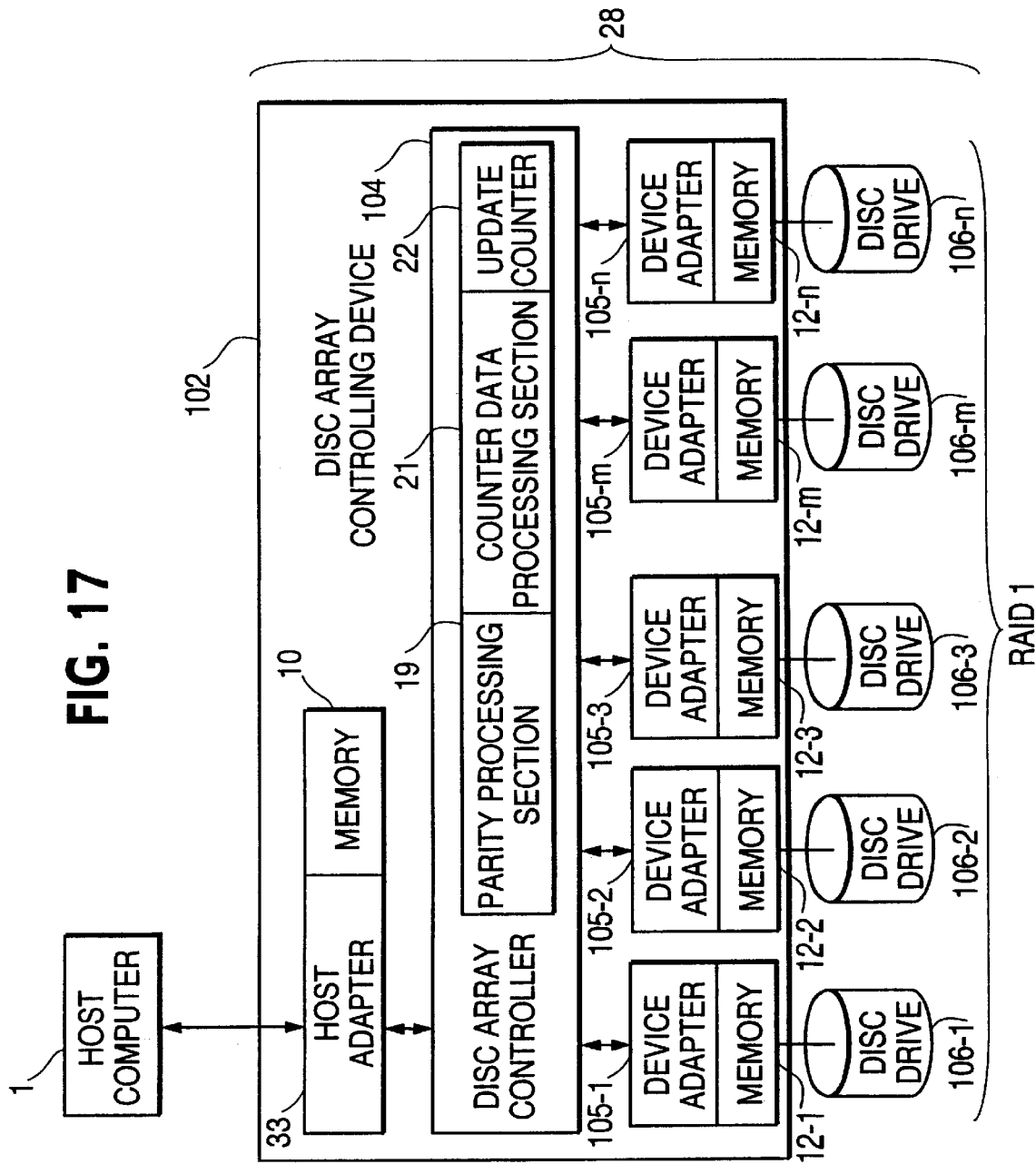
FIG. 17 is a structural diagram of the seventh embodiment of the present invention.

As in the fourth embodiment of the present invention, the disc array apparatus 28 of the seventh embodiment implements RAID-1 level. Accordingly, disc drives 106-1 to 106-n shown in FIG. 17 are paired, and each pair of disc drives stores the same data as the corresponding disc drive within the pair of disc drives (i.e., disc drive 106-2 stores the same data as does disc drive 106-1, etc.). Accordingly, RAID-1 level stores data as mirrored data in a mirrored disc structure.

Since the disc array apparatus 28 of the seventh embodiment of the present invention is equivalent to the apparatus of the RAID-1 level modified from the apparatus of the fourth embodiment, it will be explained with reference to FIG. 17. In this example, the following process is executed as follows in the RAID-1 level.

(1) Data write process in the RAID-1 level

The data read/write process in the RAID 1 level is executed as explained below. First, the disc array controlling device 102 receives via the host adapter 33, the host data requested to be written by the disc array controlling device, along with the write command from the host computer 1. Upon reception of the host data requested to be written together with the write command from the host computer 1, the host adapter 33 tentatively stores this host data into the memory 10. Next, the host adapter 33 transfers the host data to the disc array controller 104.

When the disc array controller 104 receives the host data, the counter data processing section 21 reads the current counter value from the update counter 22 and adds this counter value to the host data. Next, the disc array controller 104 issues a write command to the disc drives 106-1 and 106-2 and transfers the data (including the counter value) to the device adapters 105-1 and 105-2.

Thereafter, the device adapters 105-1 and 105-2 send the write command and the data (including the counter value) to, respectively, the disc drives 106-1 and 106-2 connected thereto. The disc drives 106-1 and 106-2 write the host data (including the counter value) to the memory medium of the disc drives. As explained above, the same host data (including the counter value) is written into the disc drives 6-1 and 6-2, and is referred to as mirror data.

(2) Explanation of processes when matching is attained in the mirror data during the read operation in the RAID-1 level in the seventh embodiment of the present invention.

The processes when matching is attained in the comparison of the mirror data during the read process in the RAID-1 level are as follows. First, when the host adapter 33 receives the read command issued by the host computer 1, the host adapter 33 transmits the contents of the read command to the disc array controller 104. The disc array controller 104 having received the contents of the read command issues the read command to the disc drives 106-1 and 106-2 with the address requested from the host computer 1.

The disc drives 106-1 and 106-2 having received the read command respectively via the device adapters 105-1 and 105-2 read the data of designated address. The data read from the disc drives 106-1 and 106-2 are transferred to the device adapters 105-1 and 105-2 respectively connected to the disc drives 106-1 and 106-2 and are then respectively stored in the memories 12-1 and 12-2.

Thereafter, the disc array controller 104 compares the data stored in the memory 12-1 of the device adapter 105-1 with the data stored in the memory 12-2 of the device adapter 105-2 (comparison of mirror data). When these data are matched as a result of comparison, the read data stored in either memory 12-1 or 12-2 (since each of memories 12-1 and 12-2 are storing the same data) is transferred to the host adapter 33 as the correct host data. Thereafter, the host adapter 33 transfers the data to the host computer 1.

(3) Explanation of the process of the seventh embodiment of the present invention when matching cannot be attained in the comparison of mirror data during the read operation in the RAID-1 level.

As explained above, when matching cannot be attained in comparison of data stored in the memories 12-1, 12-2 of the device adapters 105-1 and 105-2 during the read operation from the disc drives 106-1 and 106-2, the counter data processing section 21 searches the counter values of the data stored in the memories 12-1 and 12-2 of the device adapters 105-1 and 105-2 and decides the data having the oldest counter value is erroneous data.

The disc array controller 104 uses the data having the latest counter value as the correct host data. The data stored in the memory of the other device adapter (the device adapter not storing the oldest data, which is determined to be the erroneous data, as discussed above) is transferred to the host adapter 33 as the correct host data. The host adapter 33 receives this data and, in turn, transfers the data to the host computer 1.

8. Other Embodiments of the Present Invention

Several embodiments have been explained above. However, the present invention is not limited to the above-mentioned embodiments, and can also be implemented in other forms.

(1) A timer may be used in place of a clock 14 shown in FIGS. 7, 10, and 14. If a timer is used instead of a clock, the current timer value is added to the divided data and parity data and these data (including the timer value) are then written into the disc drives. When contradiction is detected in the matching by the parity check during data read operation, the data having the oldest timer value is defined, through comparison with other timer values, as the erroneous data. Accordingly, the host data is restructured.

(2) The update counter used in the above embodiments updates the counter value for each writing of the data. However, the present invention can also be implemented by a counter which updates the counter value every specified amount of time.

As explained above, the present invention provides the following benefits.

(1) In the conventional disc array apparatus not providing a read parity check function, the host data is restructured in the RAID 3 and RAID 5 levels from the data read from the disc drives other than that for parity without using parity data during the data read operation, and the restructured host data is transferred directly to the host. Accordingly, in the conventional disc array apparatus, if the read data is changed or lost, such an occurrence cannot be detected and, accordingly, the reliability of data, is lower than in the present invention.

On the other hand, in the present invention, the read parity check is executed during the data read operation from the disc drives. If contradiction is found in the matching of the parity checks, the correct host data is restructured and transferred to the host. Therefore, the apparatus of the present invention can be freed of not transferring the host data to the host computer during read operations because the host data is lost. As a result, the reliability of data stored and of the disc array apparatus of the present invention is improved over that of the conventional apparatus.

(2) In the conventional apparatus providing the read parity check function, the parity check is performed during the read operation, and there is no problem when the matching of data is attained. However, even if matching of data cannot be attained, the conventional apparatus informs the host computer that data matching cannot be attained, without performing additional processing. Accordingly, since host data is not sent to the host computer, host data is lost and the reliability of data stored by the conventional apparatus is lowered.

Meanwhile, in the present invention, a parity check is executed for the read data during the data read operation. If contradiction is generated in the matching of the parity checks, the correct host data can be restructured and can also be transferred to the host by executing a CRC check, time data check, or check for the counter value of the update counter, etc. Therefore, in the present invention, the loss of data is avoided, and the reliability of data and the disc array apparatus is further improved over that of the related art.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

In addition to the above effects, the present invention can also provide the following effects corresponding to each claim.

What is claimed is:

1. A disc array apparatus of RAID level 3 comprising:
a plurality of disc drives; and
a disc array controlling device controlling data read and write operations by operating in parallel said disc drives, dividing host data input to said disc array controlling device, generating first parity data from the divided data, writing the divided data into disc drives of the plurality of disc drives storing data, and writing said first parity data into one of the plurality of disc drives storing parity of said plurality of disc drives, said disc array controlling device comprising:
data write controlling means for adding cyclic redundancy check information to said host data, for dividing the host data including cyclic redundancy check information, and for generating the first parity data from the divided data to control the write operation to each disc drive;
parity checking means for generating second parity data from the divided data read from said disc drive, and for performing a parity check by comparing said first parity data with the second parity data read from said disc drive storing parity;
host data restructuring means for making a first assumption that, when contradiction is found in comparing of the first parity data with the second parity data during the parity check by said parity checking means, that erroneous data is stored in one of said plurality of disc drives, and for sequentially restructuring, in accordance with the first assumption, the host data from the data stored by the disc drives other than said disc drive assumed to be storing said erroneous data; and
cyclic redundancy check information checking means for executing a cyclic redundancy check check on the restructured host data, for, when mismatching is found by the cyclic redundancy check on the restructured host data, changing the assumption of which disc drive is storing erroneous data and repeating the cyclic redundancy check on host data restructured in accordance with the changed assumption, and defining, when matching is attained, host data corresponding to the matching as the correct host data.

2. A disc array apparatus of RAID level 3 comprising:
a plurality of disc drives; and
a disc array controlling device controlling data read and write operations by operating in parallel said disc drives, dividing host data input to said disc array controlling device, generating parity data from the divided data, writing the divided data into a plurality of disc drives for parity of the plurality of disc drives, said disc array controlling device comprising:
data write controlling means for dividing said host data, generating first parity data from said divided data, and adding time data to said divided data and parity data to control a write operation to said disc drives;
parity checking means for generating second parity data from the divided data read from said disc drives and executing a parity check by comparing said first parity data with the second parity data read from said disc drive for parity; and
host data restructuring means for comparing, when contradiction is found in comparing during the parity check executed by said parity checking means, each time data stored in said plurality of disc drives to define the data corresponding to an oldest time as erroneous data, and restructuring the host data from the data of the plurality of disc drives other than the disc drive storing said erroneous data.

3. A disc array apparatus of RAID level 5 comprising:
a plurality of disc drives; and
a disc array controlling device controlling data read and write operations by operating in parallel said disc drives, dividing input host data into units of sectors by said disc array controlling device, generating first parity data from the divided data in order to write said first parity data to one disc drive cyclically selected from said plurality of disc drives, and cyclically selected from said plurality of disc drives, and distributingly writing said divided data to said plurality of disc drives other than the one disc drive to which said first parity data is written, said disc array controlling device comprising:

data write controlling means for dividing said host data into units of sectors, generating said first parity data from this divided data and adding time data to said divided data and parity data to control the data writing operation to said plurality of disc drives;

parity checking means for generating second parity data from the divided data read from said disc drives and comparing the second parity data with the first parity data read from said plurality of disc drives to execute a parity check; and host data restructuring means for comparing, when contradiction is found in comparing during the parity check by said parity checking means, the time data stored in said plurality of disc drives to define data having an oldest time as erroneous data, and restructuring host data from the data of the plurality of disc drives other than the disc drive storing said erroneous data.

4. A disc array apparatus of RAID level 1 comprising:

two disc drives; and a disc array controlling device controlling data write/read operations by operating in parallel the disc drives to write the input host data into said two disc drives, said disc array controlling device comprising:

data write controlling means for controllably writing said host data with an addition of time data to said disc drives; and data read controlling means for comparing the data read from said two disc drives and searching, when the data are mismatched, the time data stored in said two disc drives to define the data having a latest time as correct data.

5. A disc array apparatus of RAID level 3 comprising:

a plurality of disc drives; and a disc array controlling device controlling data read and write operations by operating in parallel said plurality of disc drives, dividing host data input to said disc array controlling device, generating parity data from the divided data, writing the divided data into a plurality of disc drives for data, and writing said parity data into one disc drive for parity of the plurality of disc drives, said disc array controlling device comprising:

an update counter sequentially updating and outputting a counter value;

data write controlling means for dividing said host data, generating first parity data from said divided data, and adding said counter value to said divided data and parity data to control a write operation to said disc drives;

parity checking means for generating second parity data from the divided data read from said disc drives and executing a parity check by comparing said first parity data with the second parity data read from said disc drive for parity; and host data restructuring means for comparing, when contradiction is found in comparing during the parity check executed by said parity checking means, each counter value stored in said plurality of disc drives to define the data corresponding to an oldest counter value as erroneous data, and restructuring the host data from the data of the plurality of disc drives other than the disc drive storing said erroneous data.

6. A disc array apparatus of RAID level 5 comprising:

a plurality of disc drives; and a disc array controlling device controlling data read and write operations by operating in parallel said disc drives, dividing input host data into units of sectors by said disc array controlling device, generating first parity data from the divided data in order to write said first parity data to one disc drive cyclically selected from said plurality of disc drives, and distributingly writing said divided data to said plurality of disc drives other than the one disc drive to which said first parity data is written, said disc array controlling device comprising:

an update counter sequentially updating and outputting a counter value;

data write controlling means for dividing said host data into units of sectors, generating said first parity data from this divided data and adding the counter value to said divided data and parity data to control the data writing operation to said plurality of disc drives;

parity checking means for generating second parity data parity check from the divided data read from said disc drives and comparing the second parity data with the first parity data read from said plurality of disc drives to execute a parity check; and host data restructuring means for comparing, when contradiction is found in comparing during the parity check by said parity checking means, the counter values stored in said plurality of disc drives to define data having an oldest counter value as erroneous data, and restructuring host data from the data of the plurality of disc drives other than the disc drive storing said erroneous data.

7. A disc array apparatus of RAID level 1 comprising:

two disc drives; and a disc array controlling device controlling data write/read operations by operating in parallel the disc drives to write the input host data into said two disc drives, said disc array controlling device comprising:

an update counter sequentially updating and outputting a counter value;

data write controlling means for controllably writing said host data with an addition of the counter value to said disc drives; and data read controlling means for comparing the data read from said two disc drives and searching, when the data are mismatched, the counter value data stored in said two disc drives to define the data having a latest counter value as correct data.

8. A disc array controlling device connected to a plurality of data memory devices storing data, a first redundancy information memory device storing first redundancy information of a plurality of data stored in said plurality of data memory devices, and a second redundancy information memory device storing second redundancy information generated based on said plurality of data and said first redundancy information, said disc array controlling device comprising:

means for generating, when data is stored into said data memory devices and first redundancy information is stored into said first redundancy information memory device, relevant data including second redundancy information corresponding to the first redundancy information to be stored into said second redundancy information memory device;

first means for judging, when reading the data from said plurality of data memory devices, normality of said data based on in second redundancy information stored in said second redundancy information memory device;

restructuring means for designating, when said data is judged abnormal, only one memory device among the plurality of memory devices and restructuring data stored in said designated memory device based the information stored in remaining memory devices other than the designated memory device; and second means for judging matching of said restructured data based on the first redundancy information stored in said first redundancy information memory device.

9. A disc array apparatus according to claim 8, further comprising controlling means for sequentially executing the restructuring of the data by said restructuring means and for executing a judgement for matching of data by said means for judging.

10. A disc array apparatus coupled to a host computer transmitting a command and comprising:

disc drives storing data; and a disc array controlling device, coupled to the host computer and to the disc drives, receiving the command, determining whether the command is one of a write command and a read command, storing data and first parity in the disc drives based on the command if the command is the write command, and if the command is the read command, reading data and the first parity from the disc drives based on the command, determining second parity based on the data read from the disc drives, comparing the first parity and the second parity, transferring the data to the host computer if the second parity is equal to the first parity, and if the second parity is not equal to the first parity, determining which part of the data is erroneous and which other part of the data is valid, restructuring the data based on the first parity and the valid part of the data, verifying the correctness of the restructured data, and transferring the restructured data to the host computer if the result of said verification indicates that the restructured data is correct.

11. A disc array apparatus as in claim 10, wherein time data is stored in the disc drives corresponding to the data stored therein, and the valid data is determined based on the time data.

12. A disc array apparatus as in claim 10, wherein a counter value is stored in the disc drives corresponding to the data stored therein, and the valid data is determined based on the counter value.

13. A disc array apparatus as in claim 10, wherein the restructured data of the disc drive storing the erroneous data is validated using a cyclic redundancy check.

14. A disc array apparatus as in claim 10, wherein a cyclic redundancy check is used to validate the restructured data of the disc drive storing the erroneous data, by executing the cyclic redundancy check on each adjacent disc drive of the disc drives storing erroneous data.

15. A method for restructuring data stored in a disc array apparatus coupled to a host computer transmitting a command, said method comprising the steps of:

storing data in disc drives; and receiving, by a disc array controlling device, the command, determining whether the command is one of a write command and a read command, storing data and first parity in the disc drives based on the command if the command is the write command, and if the command is the read command, reading data and the first parity from the disc drives based on the command, determining second parity based on the data read from the disc drives, comparing the first parity and the second parity, transferring the data to the host computer if the second parity is equal to the first parity, and if the second parity is not equal to the first parity, determining which part of the data is erroneous and which other part of the data is valid, restructuring the data based on the first parity and the valid part of the data, verifying the correctness of the restructured data, and transferring the restructured data to the host computer if the result of said verification indicates that the restructured data is correct.

16. A method as in claim 15, wherein time data is stored in the disc drives corresponding to the data stored therein, and the valid data is determined based on the time data.

17. A method as in claim 15, wherein a counter value is stored in the disc drives corresponding to the data stored therein, and the valid data is determined based on the counter value.

18. A disc array apparatus comprising disc drives, said disc array apparatus coupled to and receiving data from a host computer, determining first parity based on the data, and storing the data and the first parity in the disc drives, said disc array apparatus comprising:

a disc array controlling device, coupled to the disc drives and to the host computer, reading the data and the first parity from the disc drives, determining second parity based on the data read from the disc drives, comparing the second parity to the first parity, determining erroneous data of the data read from the disc drives based on a cyclic redundancy check of the data read from the disc drives, and restructuring the data read from the disc drives based upon the first parity and valid data of the data.

19. The disc array apparatus according to claim 18, wherein the valid data is transferred to the host computer.

20. A disc array apparatus coupled to a host computer transmitting a command and comprising:

means for storing data; and means for controlling the disc array apparatus for receiving the command, determining whether the command is one of a write command and a read command, storing data and first parity in the means for storing data based on the command if the command is the weather command, and if the command is the read command, reading data and the first parity from the means for storing data based on the command, determining second parity based on the data read from the means for storing data, comparing the first parity and the second parity, transferring the data to the host computer if the second parity is equal to the first parity, and if the second parity is not equal to the first parity, determining which part of the data is erroneous and which other part of the data is valid, restructuring the data based on the first parity and the valid part of the data, verifying the correctness of the restructured data, and transferring the restructured data to the host computer if the result of said verification indicates that the restructured data is correct.

* * * * *

UNITED STATES PATENT AND TRADEMARK OFFICE
CERTIFICATE OF CORRECTION

PATENT NO.: 6,023,780
DATED : February 8, 2000
INVENTOR(S): Sawao IWATANI

It is certified that error appears in the above-identified patent and that said Letters Patent is hereby corrected as shown below:

On the title page, in the Abstract, line 4, change "Restructured" to --restructured--.

Col. 42, line 45, change "weather" to --write--.

Signed and Sealed this

Twenty-first Day of November, 2000

Attest:

Q. TODD DICKINSON

Attesting Officer

Director of Patents and Trademarks